United States Patent
Mantel et al.

(10) Patent No.: US 7,822,381 B2
(45) Date of Patent: Oct. 26, 2010

(54) SYSTEM FOR AUDIO BROADCAST CHANNEL REMAPPING AND REBRANDING USING CONTENT INSERTION

(75) Inventors: G. David Mantel, Boynton Beach, FL (US); Paul D. Marko, Pembroke Pines, FL (US)

(73) Assignee: XM Satellite Radio Inc., Washington, DC (US)

( * ) Notice: Subject to any disclaimer, the term of this patent is extended or adjusted under 35 U.S.C. 154(b) by 665 days.

(21) Appl. No.: 11/892,475

(22) Filed: Aug. 23, 2007

(65) Prior Publication Data

US 2009/0053991 A1 Feb. 26, 2009

(51) Int. Cl.
*H04Q 7/20* (2006.01)

(52) U.S. Cl. .............. 455/3.01; 455/3.02; 455/3.03; 455/3.04; 455/3.06; 455/414.1; 725/62; 725/63; 725/68; 725/70; 705/14.1; 705/14.12

(58) Field of Classification Search ....... 455/3.01–3.06, 455/414.1–414.4, 422.1, 403, 466, 418–420, 455/550.1, 517.514; 725/62–70; 705/14.1, 705/14.12
See application file for complete search history.

(56) References Cited

U.S. PATENT DOCUMENTS

| | | | |
|---|---|---|---|
| 6,029,045 A | 2/2000 | Picco et al. | |
| 6,487,721 B1 | 11/2002 | Safadi | |
| 7,180,917 B1 | 2/2007 | Marko et al. | |
| 2003/0005464 A1 | 1/2003 | Gropper et al. | |
| 2003/0023973 A1 | 1/2003 | Monson et al. | |
| 2003/0093790 A1 | 5/2003 | Logan et al. | |
| 2004/0116070 A1 | 6/2004 | Fishman et al. | |
| 2004/0244035 A1 | 12/2004 | Wright et al. | |
| 2005/0193410 A1 | 9/2005 | Eldering | |
| 2006/0136967 A1 | 6/2006 | Hellman | |
| 2006/0190970 A1 | 8/2006 | Hellman | |
| 2007/0014536 A1 | 1/2007 | Hellman | |
| 2007/0061215 A1 | 3/2007 | Waites | |
| 2007/0140318 A1 | 6/2007 | Hellman | |
| 2008/0004957 A1* | 1/2008 | Hildreth et al. ............... | 705/14 |
| 2008/0052741 A1* | 2/2008 | Dharmaji ..................... | 725/32 |
| 2008/0195468 A1* | 8/2008 | Malik ........................... | 705/14 |

* cited by examiner

*Primary Examiner*—Keith T Ferguson
(74) *Attorney, Agent, or Firm*—Roylance, Abrams, Berdo & Goodman, LLP

(57) ABSTRACT

A system is provided for generating a remapped audio stream at digital audio broadcast radios from a first audio stream using content insertion to allow tiered subscription services. A remapped audio stream is rebranded by extracting segments from the first audio stream relating to channel identification segments and disk jockey talking segments and replacing them with stored audio items (e.g., commercials, different channel identification segments and different disk jockey talking segments). Stored audio items for insertion are broadcast to the radios with messages for controlling the scheduling of insertion at the radios, and the storage and deletion of these audio segments at the radios. Stored audio items and messages can be sent using a different, localized broadcast system from that used to transmit the source audio stream to permit market-specific commercial insertion. Group file format for delivery permits intermittently used radios to receive the stored audio items and messages.

35 Claims, 8 Drawing Sheets

SYSTEM FOR AUDIO BROADCAST CHANNEL REMAPPING AND REBRANDING USING CONTENT INSERTION

CROSS-REFERENCE TO RELATED PATENT APPLICATIONS

Related subject matter is disclosed and claimed in U.S. patent application Ser. No. 10/831,343, filed Apr. 26, 2004, the entire contents of which are hereby incorporated by reference. Related subject matter is also disclosed in U.S. provisional patent application Ser. No. 60/873,599, filed Dec. 8, 2006, the entire contents of which are hereby incorporated by reference. Reference is also made to commonly owned U.S. Pat. No. 6,347,216, which is also incorporated herein by reference.

BACKGROUND OF THE INVENTION

1. Field of the Invention

The present invention relates to a system and method of remapping and/or rebranding an audio broadcast channel using over-the-air messaging to insert audio segments stored at a receiver into a received live or buffered audio stream. More particularly, the present invention relates to a method of mapping a virtual channel from an existing channel by inserting stored audio segments into a live or buffered audio stream in place of selected existing segments to create a remapped channel having similar programming to the existing channel but different amount or type of advertising, or a rebranded audio channel having similar programming to the existing channel but different broadcast station identification and/or disk jockey announcements and/or advertising.

2. Description of the Related Art

A number of providers of broadcast content (e.g., Satellite Digital Audio Service (SDARS) provider XM Satellite Radio Inc.) offer subscription services such as a monthly fee for reception of broadcast content that is primarily commercial free. Some users, however, may find the monthly fee amount to be cost prohibitive, but would consider paying for a broadcast service having a higher percentage of commercial content but a lower subscription fee.

A need therefore exists for a media transmission system that can offer different subscription rates that are based on different levels of commercial content being provided to the subscribers with the broadcast content. Further, a need exists for a system that can create another channel from an existing channel that has the same audio program content but different amount of commercial content, different station identification and/or disk jockey announcements. In other words, a need exists for a method of rebranding a channel to offer channels with the same audio programming at different price rates.

In addition, it would be beneficial to provide a Mobile Virtual Network Operator (MVNO) model in a broadcast media transmission system. The afore-mentioned need for channel remapping or rebranding gives rise to the need for creating broadcast channels from original channels that have the same program content but different commercial content and other segments targeted for a particular audience (e.g., users in a selected geographic area or in a selected demographic group) substituted for the non-program segments in the original channel. Thus, a need also exists for a Broadcast Virtual Network Operator (BVNO) model. Currently, mobile operators allow Mobile Virtual Network Operators (MVNOs) to operate on their networks to reach different customer segments or niches (e.g., an audience in a particular geographic location, or an audience of a selected demographic such as families, younger listeners, sports fans, and so on) and facilitate the implementation of specific marketing that otherwise would not be provided by the mobile operator. MVNO models can provide lower operational costs for mobile operators in terms of billing, sales, customer service, marketing, better network utilization, and so on. MVNO models can also increase average revenue per user (e.g., by offering different applications or subscription tiers or services). A BVNO model employing channel rebranding, for example, would be advantageous to offer similar benefits such as reaching a target audience with broadcast content.

SUMMARY OF THE INVENTION

Exemplary embodiments of the present invention address at least the above problems and/or disadvantages and provide at least the advantages described below.

In accordance with an exemplary embodiment of the present invention, a method of generating an audio stream with commercial insertion to provide tiered subscription services for a digital audio broadcast radio is provided that comprises locating selected segments in a first audio stream. The first audio stream has a plurality of different types of segments comprising audio program segments, audio transmission channel identification segments, and audio disk jockey segments from at least a first disk jockey, and the selected segments comprise at least one of the audio transmission channel identification segments and the audio disk jockey segments. The method further comprises extracting at least some of the selected segments to create corresponding insertion points, generating a second audio stream from the first audio stream by inserting selected ones of a plurality of stored audio items at the insertion points, the stored audio items comprising audio commercial segments, and providing tiered subscription services by providing said second audio stream to users at a lower cost than said first audio stream.

In accordance with an aspect of an exemplary embodiment of the present invention, the stored audio items further comprise audio transmission channel identification segments indicating a second channel for the second audio stream that is different from a first channel indicated for the first audio stream, and audio disk jockey segments from a second disk jockey who is different from a first disk jockey used to create the first audio stream. The method further comprises rebranding the second audio stream by inserting at least one of audio transmission channel identification segments indicating the second channel, and audio disk jockey segments from the second disk jockey into selected ones of the insertion points.

In accordance with an aspect of an exemplary embodiment of the present invention, wherein each of the plurality of segments comprises metadata associated therewith. The method further comprises generating at a segment source the metadata corresponding to respective ones of the selected segments to mark them for extraction to facilitate locating them in the first audio stream. The metadata from the segment source is provided to the digital audio broadcast radio. Metadata can also be generated that corresponds to respective ones of the audio program segments to mark them for retention to avoid their extraction from the first audio stream, or that corresponds to at least one of the audio program segments to indicate that no insertion of selected ones of the plurality of stored audio items is desired after this audio program segment and before the next audio segment.

In accordance with an exemplary embodiment of the present invention, a processor-readable storage medium is provided that has processor-readable code for programming a processing device in a digital audio broadcast radio to generate an audio stream with commercial insertion by performing operations comprising receiving a first audio stream live, and locating selected segments in the first audio stream. The first audio stream has a plurality of different types of segments comprising audio program segments, audio transmission channel identification segments, and audio disk jockey segments from at least a first disk jockey. The selected segments comprise at least one of the audio transmission channel identification segments and the audio disk jockey segments. The operations further comprise extracting at least some of the selected segments to generate corresponding insertion points and storing the remainder of the first audio stream in a buffer, and inserting selected ones of a plurality of audio commercial items at the insertion points to generate a second audio stream for playback by the radio.

In accordance with an exemplary embodiment of the present invention, a processor-readable code programs the processing device in the radio to receive and process inserted item delivery messages comprising audio insertion items for storage at the radio. The audio insertion items are selected from the group consisting of the audio commercial items, different disk jockey segments, and audio transmission channel identification segments. The processor-readable code controls the processing device in the radio to selectively insert the audio insertion items into the second audio stream in accordance with received audio insertion item schedule messages that have been broadcast to the radios. The radios receive a radio entitlement word and digital audio broadcast service providing various channels of audio programming. The radio entitlement word indicates to which of a plurality of classifications the radio belongs, the classifications comprising at least one of radio tier levels, regions, time zones, radio types and manufacturers of vehicles in which the radios are installed. The processor-readable code further programs the processing device in the radio to respond to messages indicating an entitlement classification to which the radio belongs and to ignore messages indicating an entitlement classification to which the radio does not belong. The messages comprise at least one of the received audio insertion item schedule messages, received retention messages indicating which of the audio insertion items to purge from the radio, and messages indicating when a selected one of the audio insertion items requires acquisition and storage by the radio.

In accordance with an exemplary embodiment of the present invention, a method of providing broadcast content for insertion by radios into a received digital audio broadcast stream is provided comprising dividing content items for broadcast to radios among group files. Respective ones of the group files have between one and many content items therein and corresponding item identifiers to allow radios to store and access individual content item data and metadata of the content items for insertion. The sizes of the group files are selected by a server device according to memory constraints of the radios and the delivery durations of the group files relative to a typical radio availability time to enable reception of the content items by intermittently used radios. The method further comprises delivering the group files and messages to the radios, the messages controlling when the radios are to insert the content items into a stream for playback selected from the group consisting of a live broadcast stream received at the radios, a buffered broadcast stream, and a remapped stream.

In accordance with an exemplary embodiment of the present invention, a method of generating audio streams with commercial insertion to provide tiered subscription services for digital audio broadcast radios is provided comprising receiving and storing audio insertion items from customers, receiving schedule requests indicating channels and frequency with which the customers want their audio insertion items inserted at radios into a received digital audio broadcast stream comprising various channels of audio programming, transmitting the audio insertion items to radios for storage and access by the radios to perform insertions during playback, generating and transmitting messages to radios comprising instructions for controlling which radios store which ones of the audio insertion items, which of the channels to insert selected ones of the audio insertion items during playback at the radios based on the schedule requests, the times at which to insert the audio insertion items during playback at the radios are based on the schedule requests, and which audio insertion items are to be retained at the radios.

In accordance with an aspect of an exemplary embodiment of the present invention, the transmitting of the audio insertion items to the radios and the transmitting of the messages to the radios is performed using a first broadcast transmission system covering a large geographic area. The method further comprises receiving and storing localized audio insertion items from customers for broadcast to a smaller geographic area using a second broadcast transmission system, receiving schedule requests indicating the channels and the frequency for where and when the customers want their localized audio insertion items inserted at the radios into the a digital audio broadcast stream received at the radios from the first broadcast transmission system, transmitting the localized audio insertion items to the radios for storage and access by the radios to perform insertions during playback, and generating and transmitting messages to radios comprising instructions for controlling which radios store which ones of the localized audio insertion items, which of the channels to insert selected ones of the localized audio insertion items during playback at the radios based on the schedule requests, the times at which to insert the localized audio insertion items during playback at the radios based on the schedule requests, and which localized audio insertion items are to be retained at the radios. The radios are configured to store the localized audio insertion items, to extract selected audio segments from the digital audio broadcast stream to create insertion points, and to generate a second audio stream from the digital audio broadcast stream by inserting selected ones of the localized audio insertion items at the insertion points.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Introduction: Remapped and Rebranded Channels

In accordance with an exemplary embodiment of the present invention, a broadcast service such as a satellite digital audio radio service (SDARS) is improved using channel remapping which may include rebranding as described below. By way of an example, SDARS can provide different types of programs such as music programs (e.g., jazz, classical, rock, religious, country, and so on) and news programs (e.g., regional, national, political, financial and sports) transmitted via satellite(s). SDARS can provide such programs using on the order of 100s of broadcast channels to a radio receiver. Many of the channels provide program audio segments corresponding to a particular genre of content (e.g., news, top hits, classical music, and so on), channel identification audio segments (e.g., an announcement of the channel name and number such as "High Standards on channel 73"), and disk jockey (DJ) segments comprising disk jockey announcements and other disk jockey talking segments. Some of the channels are advertising-free while other channels contain advertisements. Remapping of an existing SDARS channel in accordance with an exemplary embodiment of the present invention allows for SDARS program content to be repackaged in a different broadcast channel to realize a number of commercial advantages.

Figure 1:
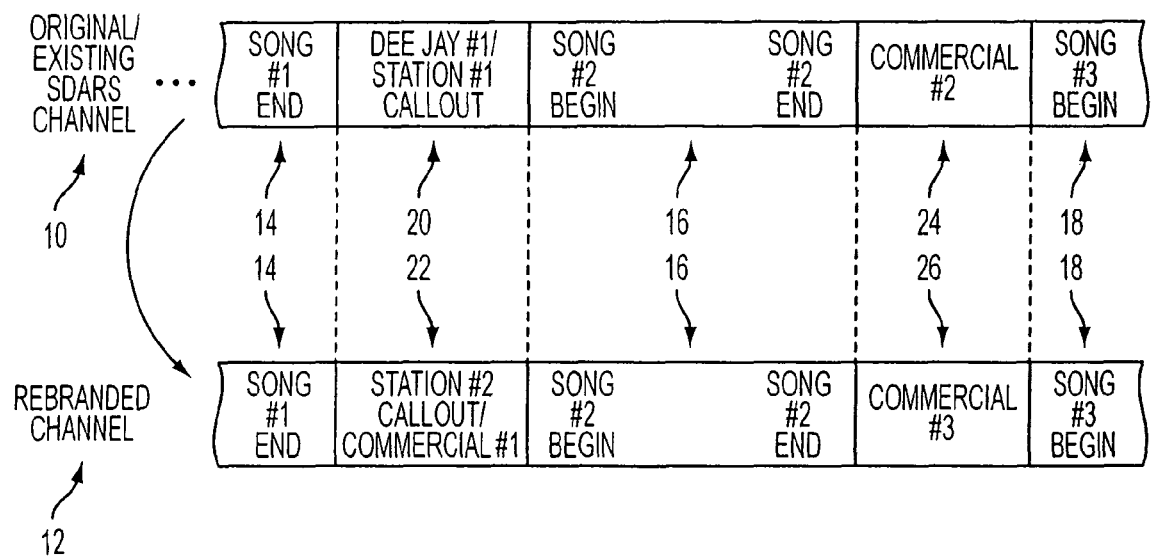
FIG. 1 illustrates a method of remapping an existing channel in a broadcast audio stream to create a virtual channel by inserting stored audio segments into the live or buffered audio stream of an existing channel according to an exemplary embodiment of the present invention.

For example, an existing SDARS channel can be modified as described in more detail below to remove existing channel identification, existing channel disk jockey segments and existing channel advertising and to insert in place of these segments a different amount and/or type of advertising, optionally different disk jockey segments, and optionally different channel identification. In any event, most if not all of the programs in the original channel would be used in the remapped or rebranded channel. As illustrated in FIG. 1, by way of an example and in accordance with an exemplary embodiment of the present invention, an existing SDARS channel 10 comprises audio programs such as songs indicated at 14, 16 and 18 that are also provided in the remapped or rebranded channel 12. The non-program segment(s) 20 and 24 in the original channel 10, however, have substituted therefor different segments 22 and 26, respectively, in the remapped or rebranded channel 12. As shown in FIG. 1, the announcements of a disk jockey no. 1 and the callout of a station or channel no. 1 (e.g., American Standards channel no. 73) in the segment(s) indicated at 20 in the original channel are replaced with, for example, the callout of a station or channel no. 2 and a commercial no. 1 in the segment(s) 22 in the rebranded channel. Similarly, the commercial no. 2 indicated at 24 in the original channel 10 is replaced with a different commercial no. 3 in the rebranded channel 12. As described herein, original broadcast audio channels are remapped when selected non-program segments (e.g., DJ talk segments, station identification callout segments or commercials) are extracted and replaced by different non-program segments. A rebranded channel is a particular type of remapped channel wherein DJ talk segments and station identification callout segments in the original channel are extracted and new station identification callout segments are inserted to identify a different broadcast source. Different DJ talk segments can optionally be inserted into the original stream, as well. It is to be understood that the extracted segments do not have to be replaced with the same type of segment (e.g., DJ talk segments or station identification callout segments) and do not have to be the same duration as the inserted segments.

As described below in accordance with an aspect of the present invention, the location of the beginnings and the ends of the respective program segments in an original channel 10 that are to be provided in its remapped or rebranded channel 12 is an important process in the replacement of non-program content in the original channel 12 with different non-program content to create the remapped or rebranded channel 14. In addition, a useful messaging and data delivery system is described herein in accordance with other aspects of the present invention to provide radios with content for substitution into a stream, and control messages regarding which content is to be substituted where and when in a received broadcast stream. Another useful aspect of the present invention described herein is the method used by a radio to keep track of stored content segments available for substitution or insertion and to retain and delete items from among these stored content segments in a controlled manner.

Remapping and rebranding as described herein in accordance with exemplary embodiments of the present invention therefore allow for the realization of a number of commercial advantages. For example, remapped channels having similar program content but different amounts of commercial content can be offered at different subscription rates to allow for tiered subscription services. Secondly, the substituted commercial segments, as well as other types of inserted segments, can be targeted for a particular audience such as users in a selected geographic area or in a selected demographic group, using different radio entitlement metadata and optionally a business model of allowing localized networks to remap and rebrand a broadcast audio stream having nationwide coverage, as described below. Thus, the present invention advantageously promotes the afore-mentioned BVNO model. BVNOs can, for example, use rebranding as described in accordance with exemplary embodiments of the present invention to reach different customer segments or niches (e.g., an audience in particular geographically location, or an audience of a selected demographic such as families, younger listeners, sports fans, and so on) and facilitate the implementation of specific marketing that otherwise would not be provided by the SDARS operator. BVNOs can provide lower operational costs for broadcasters in terms of billing, sales, customer service, marketing, better network utilization, and so on. BVNOs can also increase average revenue per user (e.g., by offering different applications or subscription tiers or services).

Overview of System for Delivery of SDARS and Content for Insertion

Figure 2:
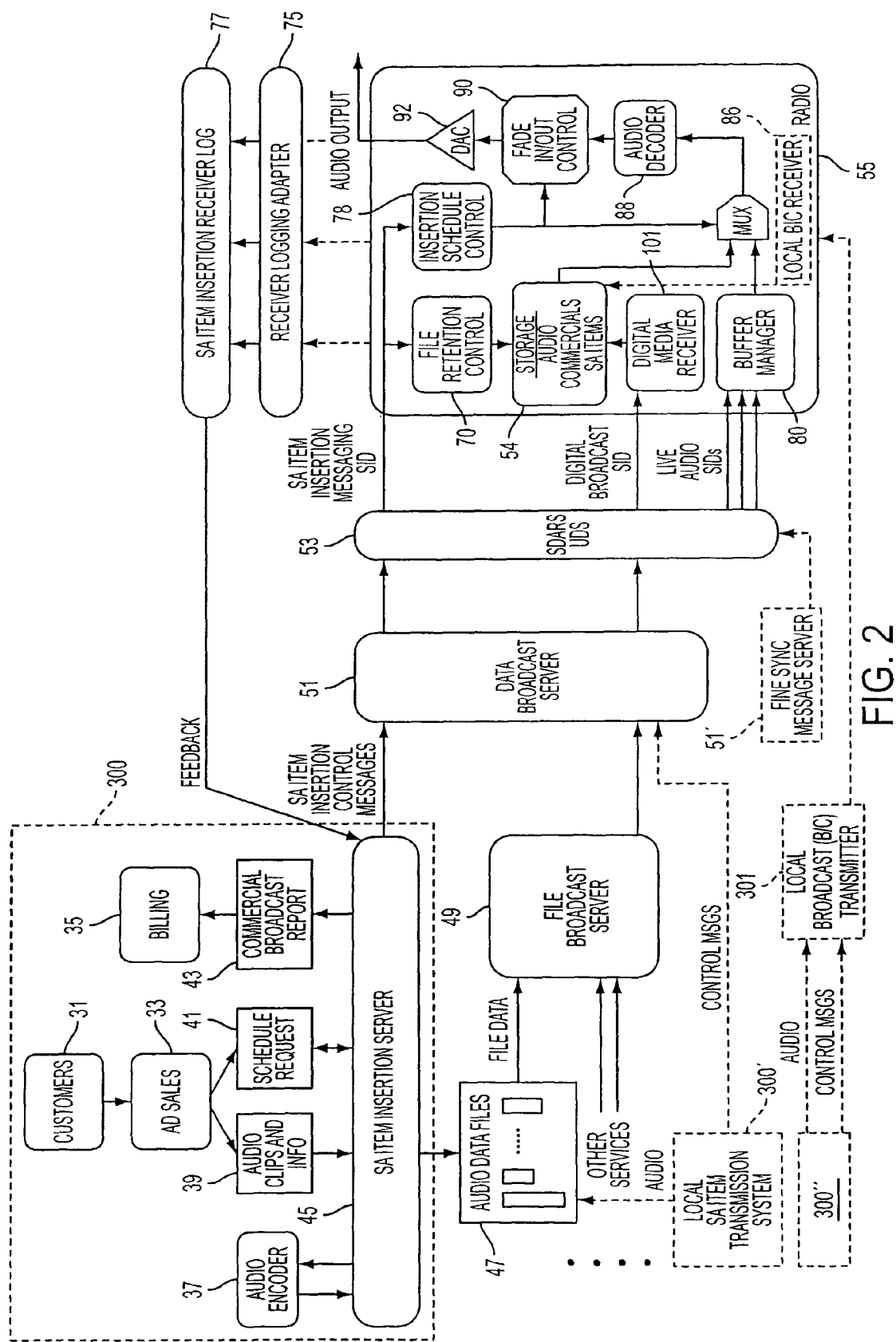
FIG. 2 illustrates a system for remapping/rebranding using stored audio item insertion system constructed in accordance with an exemplary embodiment of the present invention.
Figure 3:
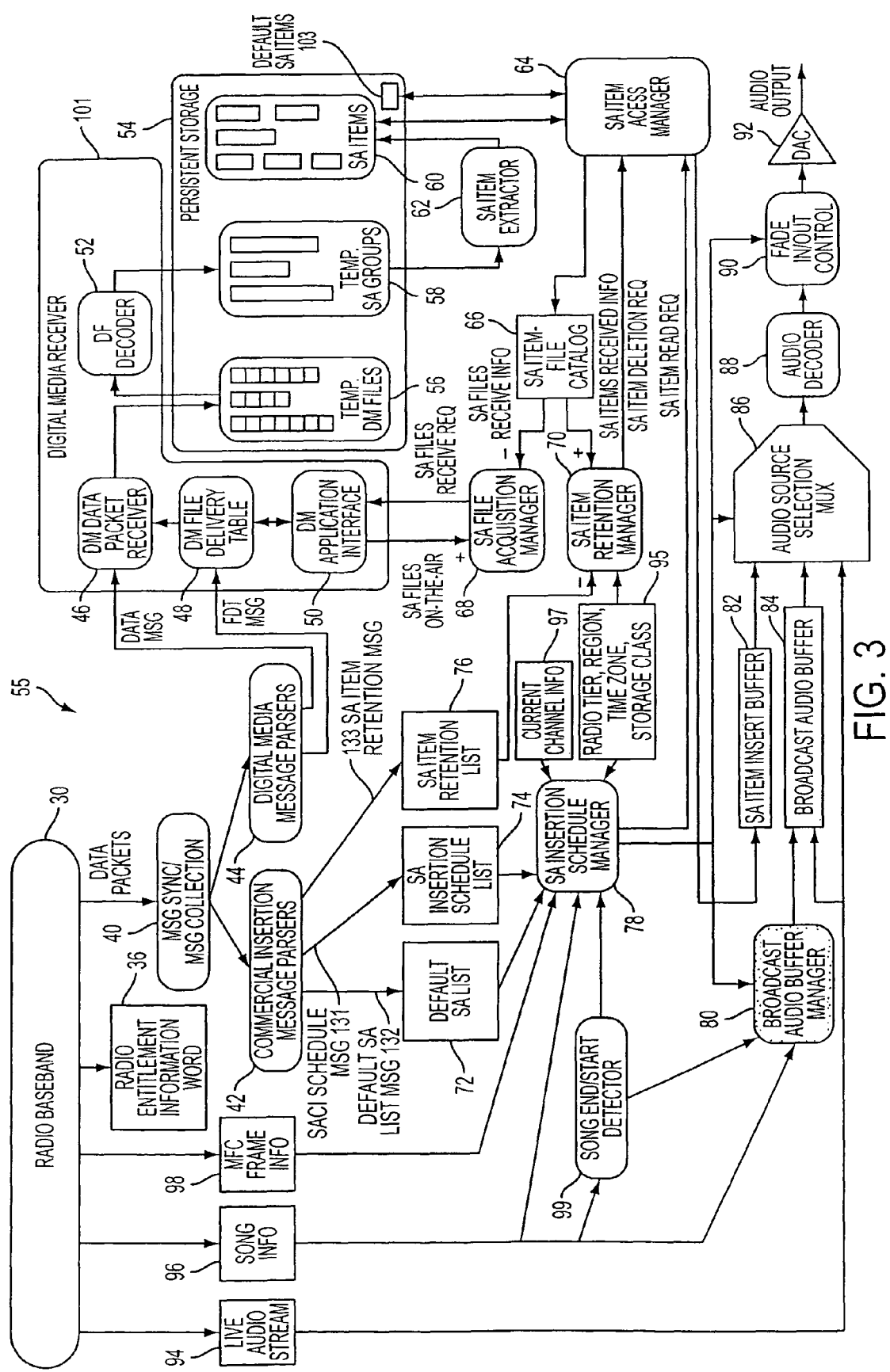
FIG. 3 illustrates a radio for implementing remapping/rebranding using stored audio item insertion in accordance with an exemplary embodiment of the present invention.

FIG. 2 illustrates a system for supporting broadcast channel remapping and rebranding in accordance with an exemplary embodiment of the present invention. In particular, FIG. 2 illustrates the transmission of the content to be substituted into a remapped or rebranded channel and associated messaging or data flow among the system entities but omits the broadcast transmission and reception of the original channel and associated stream for clarity. FIG. 3, on the other hand, provides a more detailed illustration of both reception of a broadcast stream comprising original channels and reception of file transfer data comprising content and messages for implementing remapping or rebranding or in accordance with an exemplary embodiment of the present invention.

As indicated in FIG. 2, customers 31 can purchase advertising or other broadcasting of other content via a sales entity 33 which, in turn, provides audio clips and other information 39 and SA item schedule requests 41 to an SA item insertion server 45. The SA item insertion server 45 operates with an audio encoder 37 to create SA items from the audio clips and other information 39. The SA item insertion server 45 uses the SA item schedule requests 41 to generate control messaging described below for inserting the SA items into audio streams at radios using channels and frequency of insertion agreed upon with the customers 31. Audio data files 47 comprising the SA items are provided as file data along with other services to a file broadcast server 49. The insertion control messages and data files are provided to a data broadcast server 51 for transmission to radios 55 via a uplink delivery system (UDS) 53 along with live audio content (e.g., SDARS). The UDS can comprise one or more satellites and/or a network of terrestrial transmitters. As described in more detail below in connection with FIG. 3, the radio 55 inserts SA items of customers 31 into audio streams for output. The SA item transmission system 300 preferably employs a file broadcast system in conjunction with a UDS 53 comprising satellite(s) and terrestrial repeaters (not shown) for nationwide coverage. As described below, a local SA item transmission system 300' can provide the insertion control messages and data files for localized content for insertion at receivers in a specific geographic area using one or more terrestrial transmitters of the UDS 53, or one or more terrestrial transmitters 301 that are independent of the UDS 53 as indicated by a local SA item transmission system 300".

With continued reference to FIG. 2, a radio logging adaptor 75 and SA item insertion radio log 77 can be provided as add-ons to a radio 55 to create a test radio for monitoring insertion. The feedback link is advantageous since it provides vendors of SA inserted items with information regarding when their advertisements or other vendor-sponsored content was inserted and played back by the test radio(s) 55. Using information described below relating to radio tier, region, time zone, and so on, a test radio(s) 55 can be configured to model a radio in different time zones, different tiers, among other different possible models for monitoring targeted user reception of SA items.

Overview of Radio Configured for SDARS Reception, Content Insertion, and Playback FIG. 3 illustrates a radio 55 for receiving at least one stream, the baseband 30 for which comprises the raw packets of compressed audio programming content and data packets. The audio programming packets constituting the live audio stream 94 are provided to an audio source selection multiplexer 86. As indicated at 40, the data packets are used to perform file transfer operations such as processing and storing received SA items and messaging (e.g., indicating when to insert content into a stream and how to manage stored audio items), among other file transfer operations, in accordance with exemplary embodiments of the present invention. The radio baseband 30 also comprises metadata 36 (e.g., a radio entitlement information word), song information (e.g., artist and song name, duration and/or start and end times) 96 and master frame control framing information 98. As described in more detail below, stored audio (SA) items in a SA item buffer 82 are inserted into a live stream or buffered audio stream 84 via the audio source selection multiplexer 86. The output of the multiplexer 86 is compressed content provided to an audio decoder 88. Fade in/out control 90 is provided to the SA item insertion buffer 82 and the live stream 94 transitions. The output of the fade in/out control 90 is provided to a digital-to-audio converter 92 and then output as the audio source.

With continued reference to FIG. 3, the data packets comprise message synchronization and message collection information, as indicated at 40, such as when to insert an SA item. The commercial/SA item insertion message parsers 42 can locate from the data packets such items as (1) default SA list messages 132, (2) SA commercial insertion (SACI) schedule messages 131, and (3) SA item retention messages 133.

In accordance with an exemplary embodiment of the present invention, the digital media message parsers 44 send data packets of items to be stored as SA insertion items to a file broadcast receiver 46 which transfers the packets to temporary digital media (DM) files indicated at 56 in FIG. 3. The temporary digital media (DM) files are decoded via the decoder 52. The decoded files comprise SA item group files that are stored as temporary SA groups with each group comprising multiple SA items. An illustrative use of SA group files to minimize latency on a digital media broadcast channel is described below. The SA items are then extracted from the SA groups via an SA item extractor 62 and persistently stored as individual SA items at 60. An SA item access manager 64 retrieves stored SA items 60 as needed in accordance with various control data and messages described below to place them in the SA item insert buffer 82 for playback as part of an audio stream via the audio source selection multiplexer 86. Thus, as indicated at 54, this exemplary embodiment of the present invention employs two layers to transmit, receive and process data packets intended for insertion (i.e., a group layer and an item layer) for persistent storage as SA items 60.

With continued reference to the commercial insertion message parsers 42 shown in FIG. 3, they receive data packets with messages such as a default SA list message 132 to maintain the default SA list 72. The default SA list 72 provides references to default SA items to radios 55 without previously stored SA items for insertion into a rebranded stream or other audio stream subject to commercial insertion. The commercial insertion message parsers 42 also receive data packets with messages such as a SACI schedule message 131. The SACI schedule message 131 comprises an SA insertion schedule list 74 that identifies channels or groups of channels and selected dates and/or times on which selected SA items are to be inserted for playback. When the SA insertion schedule list 74 refers to an SA item that has not yet been received and stored in persistent storage 54, the radio 55 substitutes this SA item reference with an SA item reference from the default SA list 72. The default SA list 72 thus refers to SA items that are typically more available and that are used as substitute SA items when necessary. The SA items referred to by the Default SA list 72 are more reliably available to the radio 55. These "Default" SA items may be loaded into persistent storage 54 as indicated at 103 in FIG. 3 at the time of radio 55 manufacture, or they may be broadcasted over-the-air like other SA items but at a faster rate or longer time duration.

The receiver components in the radio 55 for tuning to a channel in the SDARS received signal and the user interface processing components (not shown) track the current channel to which the radio is currently tuned, as indicated at 97 in FIG. 3, and provide the current channel data to the SA insertion schedule manager 78. The SA insertion schedule manager 78 uses the SACI schedule messages and other information such as the output of a song end/start detector 99 to determine when an SA item needs to be inserted. The SA insertion schedule manager 78 instructs the SA item access manager 64 to retrieve one or more selected SA items and provide them to the SA item insert buffer 82. The SA insertion schedule manager 78 then controls the audio source selection multiplexer 86 to selectively switch to the SA item insert buffer 82 at an insertion point when the scheduled SA item insertion is to take place within the audio stream for playback. The SA insertion schedule manager 78 also provides control data to the broadcast audio buffer manager 80 and the fade in/out control device 90 to facilitate the SA item insertion. For example, an SA item corresponding to disk jockey chatter for a rebranded channel can be inserted in place of an extracted segment comprising disk jockey chatter for an original channel that is shorter in duration. The SA insertion schedule manager 78 controls the pausing of the broadcast audio buffer 84 a sufficient duration to allow the longer segment of disk jockey chatter for the rebranded channel to play in its entirety via the multiplexer 86.

The radio tier, region, time zone, storage class information indicated at 95 in FIG. 3 provide additional means, among other types of information, to control which radios 55 are to insert which SA items. The SACI schedule message 131 can identify that insertion of a selected SA item is intended for radios in one or more of a selected radio tier, region, time zone or storage class. For example, an SA item can be scheduled for insertion into selected channels and times of lower tier radios 55 more frequently than in radios of higher tiers whose users pay more for less commercial content. In addition, an advertiser may wish to pay for the insertion of a commercial at radios installed in automobiles of a particular automobile manufacturer. These radios can store a code or value corresponding to a storage class defined for these types of automobiles. Similarly, an advertiser may wish to pay for the insertion of a commercial at radios operated in a selected geographic area or time zone for more market focused or localized advertising. The flexibility afforded by transmission and use of this type of radio entitlement information facilitates provision of different services by BVNOs.

Management of the stored SA items in the SA item file catalog 66 will now be briefly described with continued reference to FIG. 3, and is described in more detail below in connection with FIG. 7. The SA item file catalog 66 preferably comprises one input from the SA item access manager 64 and two outputs, respectively, to the SA file acquisition manager 68 and the SA item retention manager 70. The SA item access manager 64 can report the stored SA items 60 to the SA item file catalog 66. An SA file acquisition manager 68 can use the SA item file catalog 66 to determine the SA items that have been transmitted but not necessarily stored at 54 and commence an acquisition process for the SA items missing from storage 54 (e.g., using SA files receive requests). For example, the SA file acquisition manager 68 can receive SA file on-the-air messages from a DM application interface 50 that indicate the SA items that have been transmitted. The DM application interface 50 has access to a DM file delivery table 48 that is refreshed via DM file delivery table (FDT) messages received from the digital media message parsers 44. The DM FDT messages contain data relating to the transmitted SA items that is provided to the receiver 46 and the DM application interface 50 via the DM file delivery table 48.

The SA item retention manager 70 in FIG. 3 receives inputs from the SA item retention list 76 which is refreshed via SA item retention messages. The SA item retention manager 70 can compare the list 76 and the SA item file catalog 66 to determine those stored SA items 60 that are to be deleted and, in turn, send a SA item deletion request to the SA item access manager 64 to delete selected SA items 60 from storage 54.

As shown in FIG. 3, the radio tier, region, time zone, storage class information indicated at 95 is also useful to control a radio 55 to store only those SA items 60 for which that radio is enabled, as indicated by its input to the SA item retention manager 70. In other words, the radio stores control codes or values corresponding to the radio tier, region, time zone, and/or storage class(es) to which that radio 55 belongs and deletes received SA items intended for radio tiers, regions, time zones, and/or storage class(es) that do not correspond to that radio. These control codes or values can be provided to the radio via the broadcast stream and extracted from a service control word indicated at 36.

Audio stream data that facilitates recognition of a program segment ending or beginning will now be described. As stated above, SDARS can provide different types of programs such as music programs (e.g., jazz, classical, rock, religious, country, and so on) and news programs (e.g., regional, national, political, financial and sports) transmitted via satellite(s). These programs are generally time division multiplexed (TDM) into a composite data stream with other information such as overhead information (e.g., data for framing, synchronization and service layer headers). The composite data stream can be generated, for example, by time division multiplexing a plurality of broadcast channels, along with other data such as the overhead data. The composite data stream comprises frames, and each of the frames is provided with a master frame synchronization symbol and a slot control field (e.g., a field that comprises overhead data such as channel-to-slot assignment data). SDARS radios can therefore be configured to demultiplex a received composite data stream using the synchronization symbols and the slot control field data to playback a selected one of the broadcast channels.

By way of an example, and as described in the above-referenced, commonly-owned, pending U.S. patent application Ser. No. 10/831,343, filed Apr. 26, 2004, the broadcast channels of the audio stream are so named since they are preferably broadcast via satellite. It is to be understood, however, that the channels of the audio stream can be distributed by other methods such as other signal transmission methods, via the distribution of storage media having channels stored thereon, or a multi-point network. The TDM composite data stream comprises parts of different broadcast channels (e.g., prime rate channels (PRCs) or PRC symbols) arranged in time slots, a time slot control channel (TSCC), and a master frame preamble (MFP). The TSCC comprises TDM demultiplexing control information and a Broadcast Information Channel (BIC). The TSCC is useful to demultiplex the PRCs to their respective broadcast channels at a radio 55.

The MFP in the composite stream allows for synchronization at the radio 55. The TSCC comprises TDM structure information (e.g., a broadcast channel-to-PRC-to-time slot assignment table) to indicate which time slots in the composite signal comprise symbols from which PRCs or payload channels. The TDM structure information can be arranged in the TSCC as a number of time slot control words (TSCWs) corresponding to each PRC in the composite data stream. Each TSCW can consist of a selected number of bits to provide such data as a broadcast channel identification number (BCID), which identifies the location of a broadcast channel in the composite data stream. The TSCC can also comprise time and date fields and the BIC described above. The composite stream is preferably time division multiplexed (TDM) in 432 millisecond (ms) frames. The TDM frames have preambles in which framing information is provided. For example, a master frame synchronization symbol comprising a master frame preamble (MFP) and a fast synchronization preamble (FSP) can be provided for synchronization of the TDM frames. A time slot control channel (TSCC) can also be provided in the preamble which comprises information such as a frame counter and data indicating which time slots contain data from which sources. The remainder of each 432 ms frame 42 preferably comprises PRCs.

The TSCC is preferably multiplexed with the BIC. The BIC preferably comprises messages that correspond to different payload channels. An exemplary message comprises Program Associated Data (PAD) which has data associated with a channel such as a song name or label, artist name or label, service ID (SID), and program ID, among other data. The service ID is an identifier (typically 8 bits) which is associated with a specific SDARS radio service (such as Top Tracks, CNN News, The Comedy Channel, and the like) and is used by the service layer of the system to identify the specific stream containing the service at the radios 55. The program ID comprises data relating to the duration and progress of a song, for example.

The radio baseband 30 in FIG. 3 indicates the reception by a radio 55 of different data such as a radio entitlement information word 36, song information 96, and master frame count (MFC) frame information 98 described above in connection with the TDM stream. The song information comprises start and end times for programs in the audio stream and Artist/ Song Label Messages. In other words, the song information 96 facilitates partitioning of a live audio stream into its songs or programs and the buffering and synchronization of content inserted at selected points among the songs or programs in the audio stream. The partitioning is possible since changes between songs or other programs are indicated by various conditions such as changes in the above-described program ID (PID), changes in song/program title, changes in the song/ program artist/source, and so on. The MFC frame information 98 is preferably used by the SA insertion schedule manager 78 to determine when to pause the multiplexer 86 and insert an SA item from the buffer 82 since triggering of associated clocks indicate the next available break in the content. Thus, the MFC frame information 98 provides additional information as to how SA items are to be buffered and synchronized with content on the live audio stream.

In accordance with an exemplary embodiment of the present invention, fade in/out control 90 in FIG. 3 provides an important function of smoothing transitions between the original content in a received audio stream and the inserted SA items, that is, the outputs of the SA item insert buffer 82 and the broadcast audio buffer 84 as selected by the multiplexer 86. Just before an insertion point in a channel of an audio stream (e.g., 1-2 seconds before the insertion point or end of the preceding song/program), the radio 55 is programmed to decrease the volume of the preceding program/ song and then to increase the volume of the SA item being inserted. Similarly, just as the end of an inserted SA item approaches (e.g., 1-2 seconds before the beginning of the next song/program), the radio 55 is programmed to decrease the volume of the inserted SA item and then to increase the volume of the next program/song in the channel of the audio stream. The fade in/out control 90 can be implemented in a vendor-specific manner such that, for a fee, a vendor can insert their SA items into an audio stream for playback at a selected volume (e.g., a slightly higher volume than the programs/songs). The vendor selected volume can be communicated to radios 55 as part of a SACI schedule message, for example. Alternatively, the vendor selected volume can be communicated as part of the affected vendor SA items, although this is a less dynamically controlled method than using the insertion messaging. In accordance with another exemplary embodiment of the present invention, the original channel into which content is inserted at a radio is preferably a channel having minimal disk jockey talking segments that overlap with the next audio program. The fade in/out control described herein can be used to fade out the audio program affected by the disk jockey banter to create an insertion point, which is particularly useful for a rebranded channel in which the disk jockey segments from the original stream are not desirable.

With continued reference to FIG. 3, non-program items in an original audio stream that are to be extracted and replaced with inserted SA items in the playback stream are preferably extracted and discarded (not shown) before storage to the broadcast audio buffer 84. In accordance with a preferred embodiment of the present invention, the program content of the audio stream 10 is substantially the same as the rebranded/ inserted stream 12. In some cases, when the inserted content segments differ a selected amount in duration than the extracted segments, a program content item or segment may need to be discarded from the broadcast audio buffer 84 to effectively manage its capacity for storage.

In accordance with an exemplary embodiment of the present invention, a power up message is generated to indicate new channels available to the radio 55 upon radio power up and initialization such as a temporary channel change line up to accommodate a selection of holiday music channels for the month of December, or the broadcast of a live sports event, and so on.

SA Item Insertion Servers, Messaging and Group File Management

Figure 4:
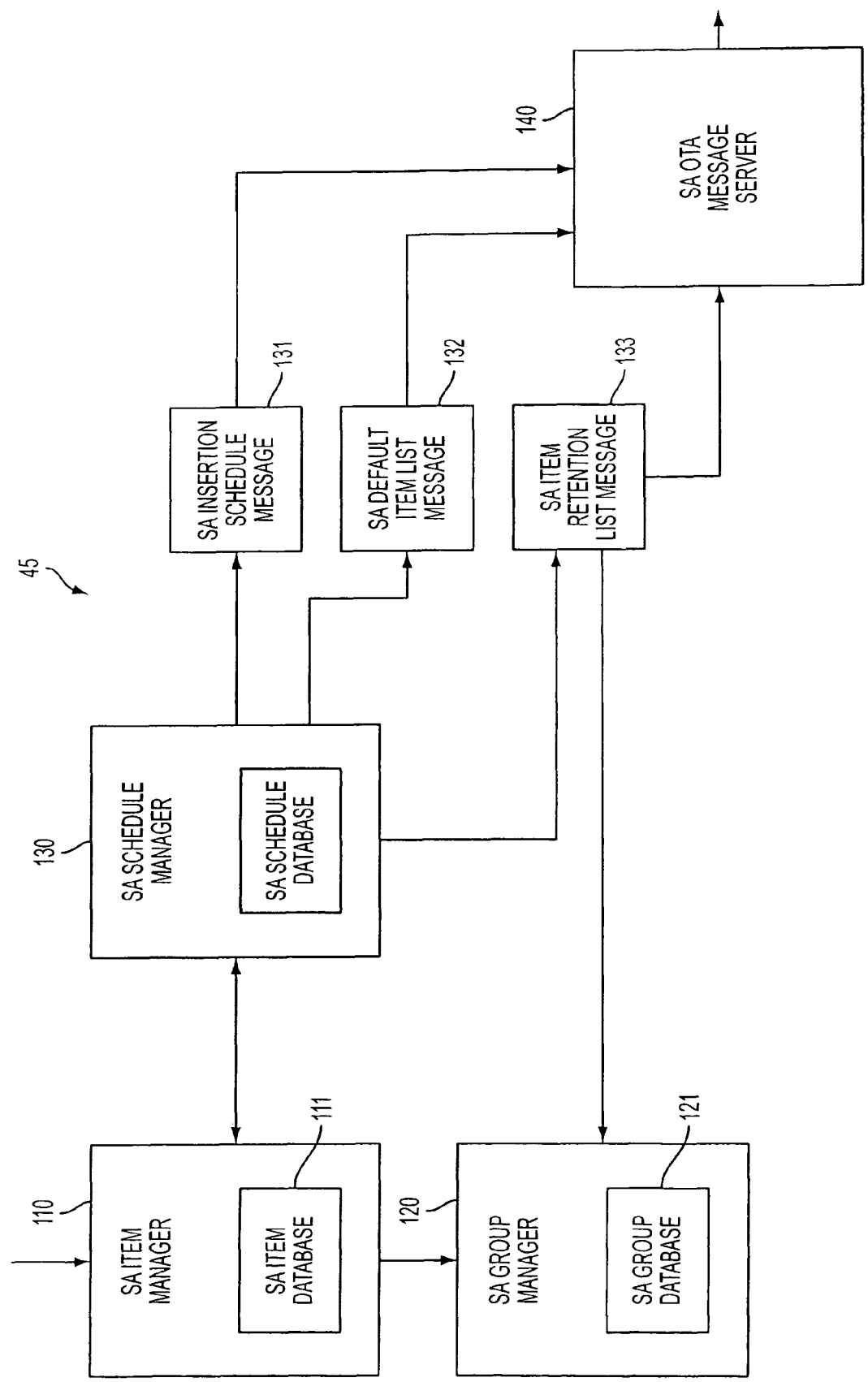
FIG. 4 is a block diagram illustrating a transmission source infrastructure for implementing remapping/rebranding using stored audio item insertion according to an exemplary embodiment of the present invention.

FIG. 4 is a block diagram illustrating additional aspects of a system to provide a Stored Audio (SA) Insertion Service according to an exemplary embodiment of the present invention. As described above, an SA service (e.g., a Commercial Insertion Service or CIS) permits content such as over the air content (e.g., broadcast program comprising audio segments) to be modified by substituting new audio segments for different audio segments currently in the broadcast stream prior to playback at a radio. An exemplary embodiment is Commercial Insertion (CI) whereby selected audio segments such as Disc Jockey announcements and radio station identification announcements are removed from the broadcast stream and different audio segments such as commercials are substituted. As described below, this is particularly advantageous for establishing hierarchical subscription services whereby different subscription levels are offered to subscribers at different rate depending on the degree to which the broadcast stream played back at the subscribers' radios contains commercial content. In other words, lower cost subscription tiers are available; however, these streams would comprise more commercial content than the streams played back at the radios of subscribers paying higher subscription rates.

In the description below, a number of terms are used as follows:

Stored Audio Item: A segment of audio data that represents a single audio entity (e.g., a Commercial). The Stored Audio Items are stored in the radio's persistent storage 54. They are either received Over-the-Air, or in some cases available as Factory Default.

Stored Audio Item Sequence: An ordered series of one or more Stored Audio Items. This Sequence of Stored Audio Items is inserted together as a group for playback to the user (e.g. a Commercial Break).

Stored Audio Group File: A Stored Audio Group File contains one or more individual Stored Audio Items. Stored Audio Group Files are received Over-the-Air through a Digital Media Broadcast Channel that is preferably different from the SDARS broadcast channel.

Referring to FIG. 4, the SA Insertion Service 100 enables delivery and insertion control of Stored Audio (SA) via over-the-air messages. By way of an example, the SA item insertion server 45 in FIG. 2 comprises a Stored Audio Item Manager (SA Item Manager) 110, a Stored Audio Group Manager (SA Group Manager) 120, a Stored Audio Schedule Manager (SA Audio Schedule Manager) 130, and a Stored Audio over-the-air (OTA) Message Server (SA OTA Message Server 140).

The SA Item Manager 110 receives and manages at least one SA Item from customers via an audio source 39, which is a segment of data that represents a single audio entity, and assigns a unique ID to each SA Item in a SA Item Database 111.

The SA Group Manager 120 receives and manages at least one SA Group File, which contains one or more individual SA Items received from the SA Item Database 111 in the SA Item Manager 110, and the metadata describing them, and assigns a unique ID to each SA Group File in a SA Group Database 121.

Upon receiving a schedule request 41 and an SA Item from the SA Item Manager 110, a SA Schedule Manager 130 can prepare one or more of a SA Insertion Schedule Message 131, a SA Default Item List Message 132, and a SA Item Retention List message 133 as needed for sending over-the-air via a SA OTA Message Server 140.

A "Stored Audio Retention" message (SA Item Retention Message 133) is also provided in accordance with an exemplary embodiment of the present invention that facilitates radio storage management for Stored Audio Items that are being broadcasted and currently utilized/referenced. Further description of SA item retention messages 132 is provided below with respect to use of SA Group Files.

In accordance with an exemplary embodiment of the present invention, a Schedule Information message (e.g., SA Insertion Schedule Message 131) is provided that conveys:

What channels should Stored Audio Items be inserted on.

For each specified channel (group), when should the Stored Audio Items be inserted (a Trigger).

For each Trigger, what specific sequence of Stored Audio items should be inserted.

In accordance with an exemplary embodiment of the present invention, a Default Stored Audio Message (e.g., SA Default Item List Message 132) is provided that provides a list of "backup" SA-Items that may be inserted when the primary SA-Items (referenced in the SAI Schedule Message) are unavailable (not yet received by the radio). Further description of Default Item List Messages is provided below after the following description of Group File Format.

In accordance with an exemplary embodiment of the present invention, a File Format for the SA-Group File is provided to enable the radio 55 to access individual SA Item data and metadata. The SA Group File contains one or more SA Items. Each Item consists of compressed audio data for the item, along with metadata fields that describe the item, such as compression format, artist and song text titles, and the like. The items in the file are identified and referenced by SA Item IDs. The file header specifies the total number of items in the file, and a list of the file address offsets to access each item. The SA Group Files can be broadcasted and received by the radios 55 using a Digital Media Broadcast Channel (DMBC) as illustrated in FIG. 2. Multiple SA Group Files may be broadcasted concurrently, with each SA Group File containing a subset of the overall Stored Audio. The radio extracts and stores the individual SA Items from the received SA Group Files to the radio file system 54 (Flash, Hard Disk Drive persistent storage, etc.).

The Stored Audio Group File Format (SA Group File Format) supports inclusion of multiple Stored Audio Items (SA Items/SA Segments) in a single Stored Audio File (SA File). The SA File Format allows for multiple instances of SA Files, with each SA File containing different groups of SA Items. Each SA Item, across all SA Files, is uniquely defined by a SA Item ID number.

The File Format employed in accordance with an exemplary embodiment of the present invention is advantageous for a number of reasons. Constraints exist on minimum and maximum file sizes for files transported on a File Broadcast Channel (FBC). The use of the SA Group File as described herein is based on minimum file size constraints of the File Broadcast Channel.

Generally, a FBC (e.g., the DMBC depicted in FIG. 2) provides the end-to-end mechanism for broadcasting "application" files from an originating application server, over the SDARS wireless network, and to radios 55 supporting the application that uses these delivered files. The FBC Server (e.g., server 49 in FIG. 2) supports the file delivery on the transmission end, while the FBC Receiver (e.g., the receiver 101 in FIG. 3) supports the file recovery/reconstruction on the receiving end. In the context of this invention, the "application" is the rebranded or remapped service.

Broadcasting files to radios 55 that are available (e.g., turned-on) at indeterminate or random times and durations presents special requirements to an FBC. FBC implementations typically employ Forward Erasure Correction Coding to enable the reconstruction of application files based on the radio's reception of a defined minimum number of Erasure Correction Coded packets. Examples of Erasure Correction Coding methods are Reed-Solomon Erasure Correction Coding and Erasure Correction Coding provided by Digital Fountain, Inc.

Without Erasure Correction Coding, the radio 55 must collect all uncoded packets that make up an application file, the uncoded packet sequence being repeated as part of a "carousel". When the delivery duration of the multiplex of all the application files is very long relative to the typical radio availability time (i.e., the length of the individual time blocks for which the radio is typically turned on, for example a user's daily 30 minute drive to work and from work, the time block then being 30 minutes), then there is a low probability of the radio on-period coinciding with the delivery of each of the uncoded packets that make up the application file. There is then statistically a long latency before the radio 55 eventually collects all the uncoded packets and recovers the desired application file.

The FBC (e.g., DMBC in FIG. 2) typically imposes constraints on minimum and maximum sizes for the application files. Smaller files typically result in increased bandwidth inefficiency due to resulting smaller packet payload sizes relative to packet header sizes. Larger file sizes may result in increased memory required by the FBC Receiver 101 to decode the larger files.

To control the minimum file size, the remapping/rebranding service described herein implements the SA Item Group File 420. The SA Item Group File contains one or more SA Items 60. Small sized SA Items (e.g., low bit rate and short duration audio commercials or station call-outs) are grouped together into one SA Item Group File to obtain a larger file. This larger SA Item Group file is then presented to the FBC Server 49 for delivery, thus reducing any bandwidth inefficiency associated with the delivery of smaller application files.

To control the maximum file size, the remapping/rebranding service of the present invention can:
1. limit the Service to include SA Items that are less than a maximum bit rate and time duration that satisfies available memory constraints of the radio 55.
2. rely on FBC support of fragmenting of application files into smaller sub-files, which are then individually decoded and then defragmented at the FBC Receiver 101 to reconstruct the original application file. Memory requirements are then only constrained by the size of the smaller sub-files.
3. support the fragmenting and defragmenting of application files as described above, directly by the remapping/rebranding service application layer, outside the FBC layer.

The illustrative example of FIG. 3 describes option 1 above.

In some cases it may be beneficial to broadcast multiple smaller SA Group Files, with each SA Group File containing fewer SA Items, instead of broadcasting one large SA Group File containing all SA Items. For example, splitting the SA Items across multiple SA Group Files may be desirable for minimizing delivery latency of SA Items across the Digital Media Broadcast Channel. A single Digital Media File can be "reset" and updated with a new SA Item without "resetting" all the other Digital Media Files. "Resetting" a Digital Media File means radios accumulating the file restart the accumulation process, resulting in increased delivery latency for all items in that file. This is because packets received as part of the initial Digital Media File, which are typically Erasure Correction Coded Packets, are no longer compatible with and cannot be used in the recovery of the newly "reset" Digital Media File.

According to another exemplary embodiment of the present invention, a timed series of images/banners and/or text strings, referred to as a flick, or a static image (JPEG, GIF, PNG) may be optionally specified for each Stored Audio Item. The flick items may be specified as external to the Stored Audio File and referenced by a Flick ID. The flick or image can be specified as Internal and embedded in the Stored Audio Item File.

As stated above, SA Item Retention Message 131 lists the SA Items that are in use and which should be retained in radio storage. Any SA Item no longer listed in the message may be removed from radio storage, to free space for new SA Items 60 in storage 54. The SA Item Retention Message 133 thus facilitates radio storage management.

The SA Items Retention Message 133 can identify SA Items directly by SA Item ID or can identify SA Items indirectly using SA Group ID. For example, all SA Items that belong to the referenced SA Group may be retained by the radio. Using the SA Group ID may result is bandwidth savings when many SA Items are delivered in a few SA Groups.

The radio maintains each SA Item File in storage as long as it is referenced in the SA Item Retention Message 133. It can be referenced either by the SA Item ID directly, or by SA Group ID indirectly.

Another exemplary embodiment of the present invention provides that a SA Default Item List Message specifies a list of backup SA Items that may be inserted when primary SA Items are unavailable. For example, while a radio is waiting to receive newly broadcasted SA Items. Primary SA Items are the SA Items scheduled for insertion via the SA Insertion Schedule Message. The Default SA Items are regular SA Items delivered over-the-air in the SA Files and are listed in the Default SA List Message.

Factory Default SA Items are preloaded onto each radio. These items may also be referenced by this Default SA List Message.

The Default SA Item List represents a "round robin" type schedule. Whenever a Primary SA Item is unavailable for insertion, the radio inserts the next Default SA Item from the Default SA List and updates a "Default SA Item pointer" to the following SA Item. The radio sequences through the Default SA List and eventually wraps back to the beginning of the list.

The Default SA Item List entries may contain both individual SA Items identified by SA Item ID and SA Groups identified by a SA Group ID. In the case of a SA Group ID in the list, all SA Items in this identified SA Group that are flagged as default type are utilized as Default SA Items and included into the overall Default SA round robin.

Another exemplary embodiment of identifying SA Items for Default use would be to eliminate the Default SA List Message and to only flag SA Items for Default use using fields within the SA Group/Item File. With this method, aging control, such as removing SA Items for Default Insertion use, could be controlled using the SA File Retention Message.

The advantage of the Default SA List Message implementation is in the provision of positive and flexible real-time control over specifying the Default SA Items. Over time, some SA Items initially used as default may no longer be desired as default Items, but may still be used as Primary Items. Conversely, some items initially used as only Primary SA Items may become Default Items.

Radio Entitlements and Processing SA Item Insertion Schedule Messages at Radios

Hereinafter, Radio Class Types 200 for enabling targeted commercial or SA Item insertion according to an exemplary embodiment of the present invention will be described with reference to FIG. 5.

Instead of globally scheduling the same commercials or SA items to all radios regardless of radio types, radio time zone, and radio locations, different commercials can be targeted to different classes of radios. For example, additional commercials can be inserted for a class of radios that pay a lower cost subscription, different commercials can be inserted for radios that are assigned to different regions, and the same commercials can be inserted at different absolute times depending on assignment of radios to different time zones.

Figure 5:
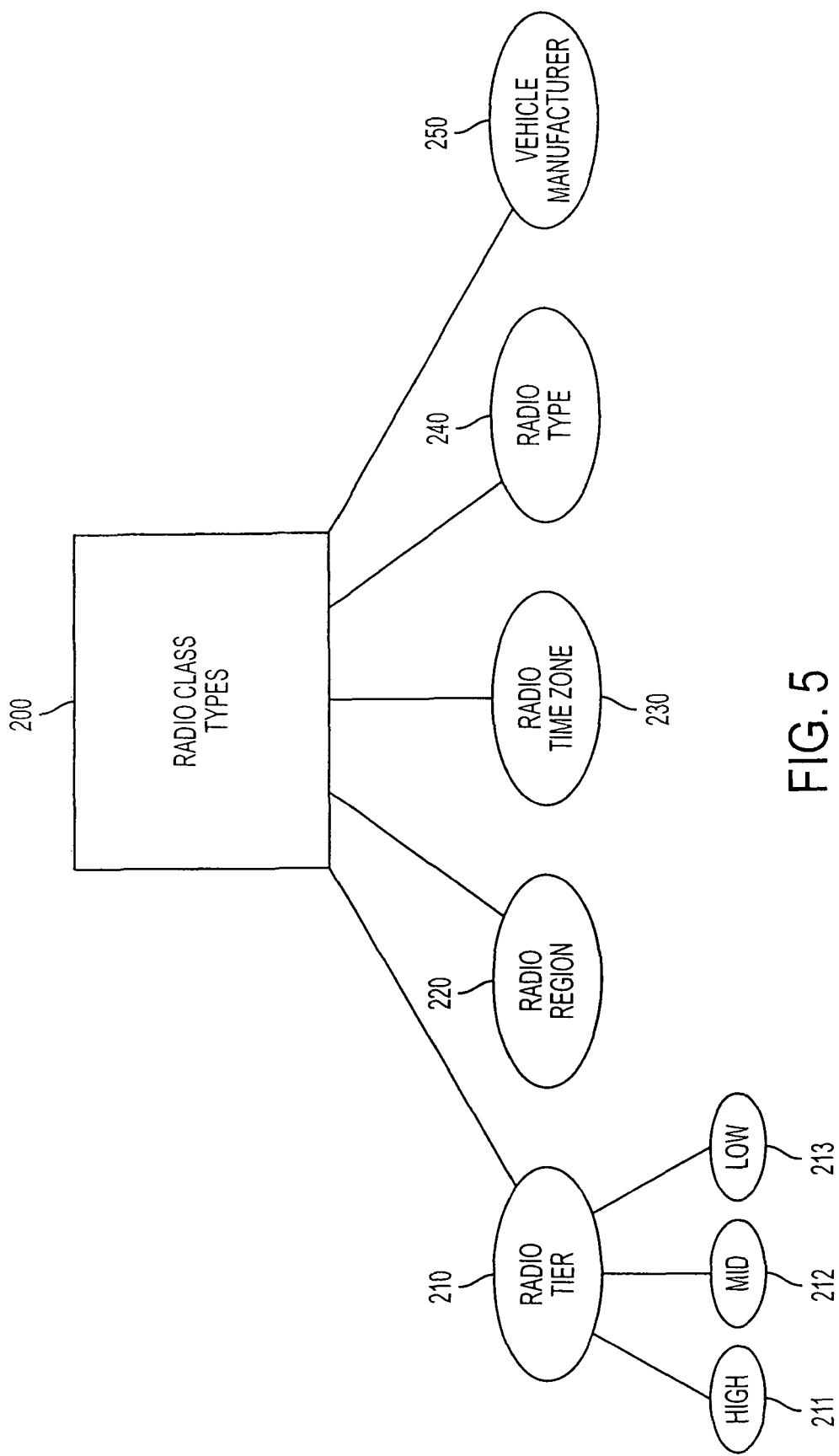
FIG. 5 illustrates radio class types and other radio entitlements for enabling targeted commercial or stored audio item insertion according to an exemplary embodiment of the present invention.

FIG. 5 illustrates exemplary radio classification assignments that enable customizing the SA Item/Commercial Insertion Service operation across different radios.

Each radio can be assigned to a particular radio tier 210, where the higher radio tier 211 corresponds to a higher subscription price rate with no commercial insertions, and the lowest tier 213 corresponds to a lower subscription price rate with the most commercial insertions. The highest radio tier 211 level completely disables the Commercial Insertion Service 100 and all commercial insertions are "filtered-out". The lowest radio tier 213 level "filters-out" the fewest number of commercial insertions. Mid-level radio tiers 212 "filter-out" some intermediate number of commercial insertions, depending of the associated tier levels given in the SA Insertion Schedule Message 131. The Radio Tier level is assigned to each radio using metadata such as a metadata flag or word (e.g., Radio EntitlementInformation Word) 36.

The metadata basically provides a way of telling individual radios that the radio is enabled or disabled for specific features, or a specific tier level of a feature or service. Secure messages are transmitted over-the-air to the radio with this metadata information. The radio's metadata flags are updated by these over-the-air messages. Different metadata flags or words are assigned to different features. And the value of the flag or word or individual bits of the word can enable or disable different aspects of the feature/service. Each different feature can define different bit fields of its metadata flag or word to mean different things (e.g. a tier level or flags to enable/disable different aspects of the feature/service). In the case of the Commercial Insertion feature/service, a radio checks its metadata flag or word 36 assigned to the Commercial Insertion Service and acts based on the metadata flag or word value (e.g., if the Tier Level field of the metadata flag or word is the highest level, then no commercials are inserted by the radio). When a user has signed up for no-commercials/paid-service, an over-the-message is sent to the radio to update its Commercial Insertion metadata flag or word appropriately (e.g., with the highest Tier Level value).

Each radio can also be assigned to a region. Specific commercials can be targeted to specific regions using this Radio Region 220. The radio region code is assigned to each radio using a metadata flag.

Additionally, radios can be assigned to different Radio Time Zones 230. The time-of-day at which commercials are inserted can be specified relative to the radio's time zone 230. Selected commercials can be scheduled for insertion relative to local time, rather than an absolute time. In this way, premium rate commercial insertions can be targeted to peak listening times for all time zones while other non-premium rate commercials can be sold for off peak times. The radio time zone code is assigned to each radio using a metadata flag 36. For example, a radio may be programmed over-the-air via a metadata flag to a particular time zone based on billing or shipping address. In accordance with an alternative method of radio time zone assignment, the user's manual programming of time zone is used, but this method less preferred since the user may not use the radio's manually settable local time zone feature, or the user may intentionally set the time zone incorrectly to offset commercial insertions away from peak listening periods. Another alternative time zone assignment method may be based on a radio automatic location calculation.

Additionally, a Radio Type 240 classifies a radio into one or more of the following general types: Vehicle Factory Installed, Vehicle Aftermarket, Home Equipment, and Wearable. Different schedules can be targeted to these different Radio Types. The radio type may be a hard coded radio value. A radio may be hard coded with more than one code.

The vehicle manufacturer 250 specifies the manufacturer of the vehicle. Different schedules can be targeted to radios tagged with these different vehicle manufacturers. To support this classification, OEM factory installed radios may be factory programmed with this vehicle manufacturer code.

The SA Insertion Schedule Message 131 is a message that communicates scheduling information for Stored Audio insertion and specifies what Stored Audio Items are to be inserted at what times and on what Service IDs or Categories. The message contains multiple SA Insertion Schedule Entries. Each SA Insertion Schedule Entry specifies a set of Service IDs or Categories, a series of Master Frame Count Triggers (MFC Triggers), a Tier Level, a Region Mask, a Radio Type Mask, a Vehicle Manufacturer Mask, and a Radio Storage Class Mask.

A set of Service IDs or Categories communicates information regarding where to insert the Stored Audio into the live stream.

Each series of MFC Triggers define when, that is, the times at which to insert Stored Audio Item Sequences into the live stream. For each MFC Trigger, one or more different Stored Audio Item Sequences are specified which defines what information should be inserted into the live stream. Each Stored Audio Item Sequence is specified by a reference to Stored Audio Item (SAI) Sequences that are defined in the SAI Sequence List Field of the SA Insertion Schedule Message 131.

The SAI Sequence can be either "One Shot", wherein the entire sequence is played on upon the associated MFC Trigger, or "Round Robin", wherein a subset of a long sequence of Stored Audio Items is played for the insertion duration upon the associated MFC Triggers and the radio increments through the sequence for each subsequent associated MFC Trigger, eventually wrapping back to the start of the sequence.

Tier Levels selectively enable/disable insertion based on the radio tier. The Tier Levels are attached to each Stored Audio Item in the SAI Sequences, each Service ID/Category in the Target Service ID/Category Groups, and each MFC Trigger in the MFC Trigger Groups. A Stored Audio Item is enabled for insertion only if the radio tier value is less than all three associated Tier Levels (Service ID/Category, MFC and SAI Tiers). The radio Tier Level is obtained from a radio metadata flag 36. The radio Tier Level may therefore be updated over-the-air.

Region Masks selectively enable/disable insertion based on a Radio Region Code and identify the region to which a schedule entry is targeted. The Region Masks are attached to Stored Audio Items, Target Service IDs/Categories, and MFC Triggers. A Stored Audio Item is enabled for insertion only if the Radio Region Code is enabled in all three associated Region Masks. The Radio Region Code is obtained from a radio metadata flag or word 36, therefore the Radio Region Code may be updated over-the-air.

A Radio Type Mask selectively enables/disables insertion based on a Radio Type parameter that is typically programmed in the factory. For example, the parameters may include one or more of the following: factory installed, home, aftermarket vehicle or wearable.

A Vehicle Manufacturer Mask selectively enables/disables insertion based on the vehicle manufacturer for the vehicle the radio is installed in.

A Radio Storage Class Mask selectively enables/disables insertion based on a Radio Storage Class parameter that is hard coded based on the radio's available storage space.

The Trigger Enable Time is a time at which a Schedule Entry from the SAI Schedule Message is enabled for insertion. After the Trigger Enable Time occurs, the insertion then occurs on the next detected song end/start boundary. Determination of song or audio segment end/start time is described below.

A Trigger Time can be either an absolute time, determined by an absolute MFC Trigger value, or can be a Time Zone relative time, determined by the MFC Trigger value adjusted by a radio's Time Zone Offset Code. A Time Zone Trigger Offset Type enables or disables time zone relative to MFC Triggers. The SAI Schedule Message's "Time Zone Trigger Offset Enable" field selects either "Absolute Trigger Time" or "Time Zone Relative Trigger Time" for the Trigger sequence in a given Schedule Entry.

For "Absolute Trigger Time" mode, the Trigger Enable Time is essentially a MFC Trigger value from the message.

For "Time Zone Relative Trigger Time" mode, the radio offsets the MFC Trigger value based on the Radio Time Zone Offset Code. Each Code value corresponds to a service area time zone. Each radio will adjust the actual Trigger Enable Time based on its own programmed Radio Time Zone Offset Code.

Figure 6:
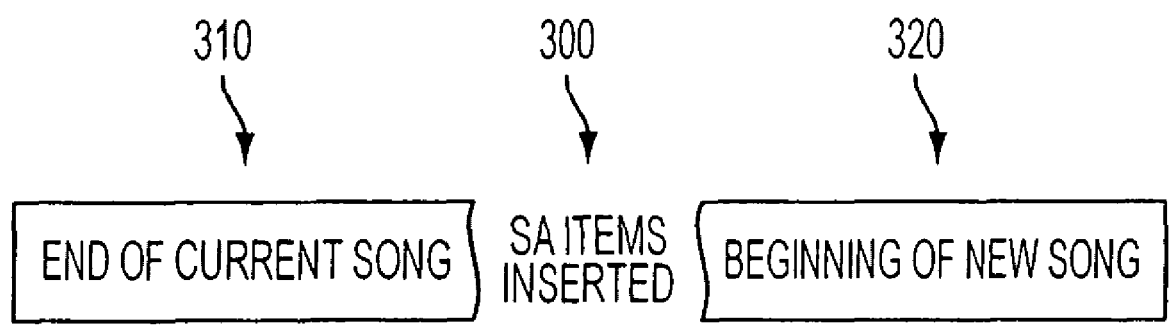
FIG. 6 illustrates stored audio item insertion according to an exemplary embodiment of the present invention.

Hereinafter, a method of messaging for precise control of SA insertion according to an exemplary embodiment of the present invention will be described with reference to FIG. 6.

As briefly discussed above, the SAI Schedule Message 131 specifies insertion points or "Time Windows" during which SA Items may be inserted 300. After an insertion point or within a "Time Window", SA Items are inserted at the end of a "current" song 310 in a data stream and before the start of the "next" song 320, wherein the "next" song is buffered and its play is delayed until the SA Insertion sequence is complete. It is important that the radio be able to accurately determine the end/start times of songs to avoid introducing audible discontinuities. The above-described application of fade-out/fade-in by the radio is helpful in reducing the required accuracy for song end/start time determination.

An exemplary embodiment of the present invention provides that determination of the song end/start times by the radio may be done by detecting a change in value of the Program ID field of a received artist/song label message, which is a Broadcast Information Channel (BIC) Message. As indicated above, the BIC message is described in commonly owned U.S. patent Ser. No. 10/831,343, filed Apr. 26, 2004, the entire contents of which are incorporated herein by reference. The accuracy of this method is best case +432 msec. In other words, the message goes out on the same frame in which the song starts. Another exemplary embodiment of the present invention provides that the Program Duration Message (a BIC message) may specify the frame number (MFC) in which a current or upcoming song starts, and specifies the length of this song in Frames. This method should provide a song end/start accuracy of +432 msec.

It may also be desirable to avoid insertion of SA Items between certain Songs. For example, such as when two or more songs, programs, jingles, or DJ announcements are related and intended for uninterrupted back-to-back play. A reserved bit in the artist/song label message can be applied to signal that the corresponding song should not be followed by a SA Item Insertion.

The implementation of the SA Insertion feature requires that the "live" channel audio streams be buffered via the broadcast audio buffer 84 during SA Insertion sequences, and then played following the completion of SA Insertion. Due to finite buffer length, after some number of SA Insertion sequences, a number of buffered songs may need to be dropped due to a buffer full condition. It may be desirable to disable dropping or deletion of some specified songs. For example, the radio may drop songs not marked as "protected" from the buffer instead of any song marked as protected. An unused bit in the broadcast artist/song label message can be applied to signal that the corresponding song should not be deleted from the radio buffer and should always be played.

SA Item Acquisition, Storage and Deletion at the Radios

Hereinafter, a method of Radio Stored Audio file reception and Stored Audio Storage Management according to an exemplary embodiment of the present invention will be described with reference to FIG. 7.

Figure 7:
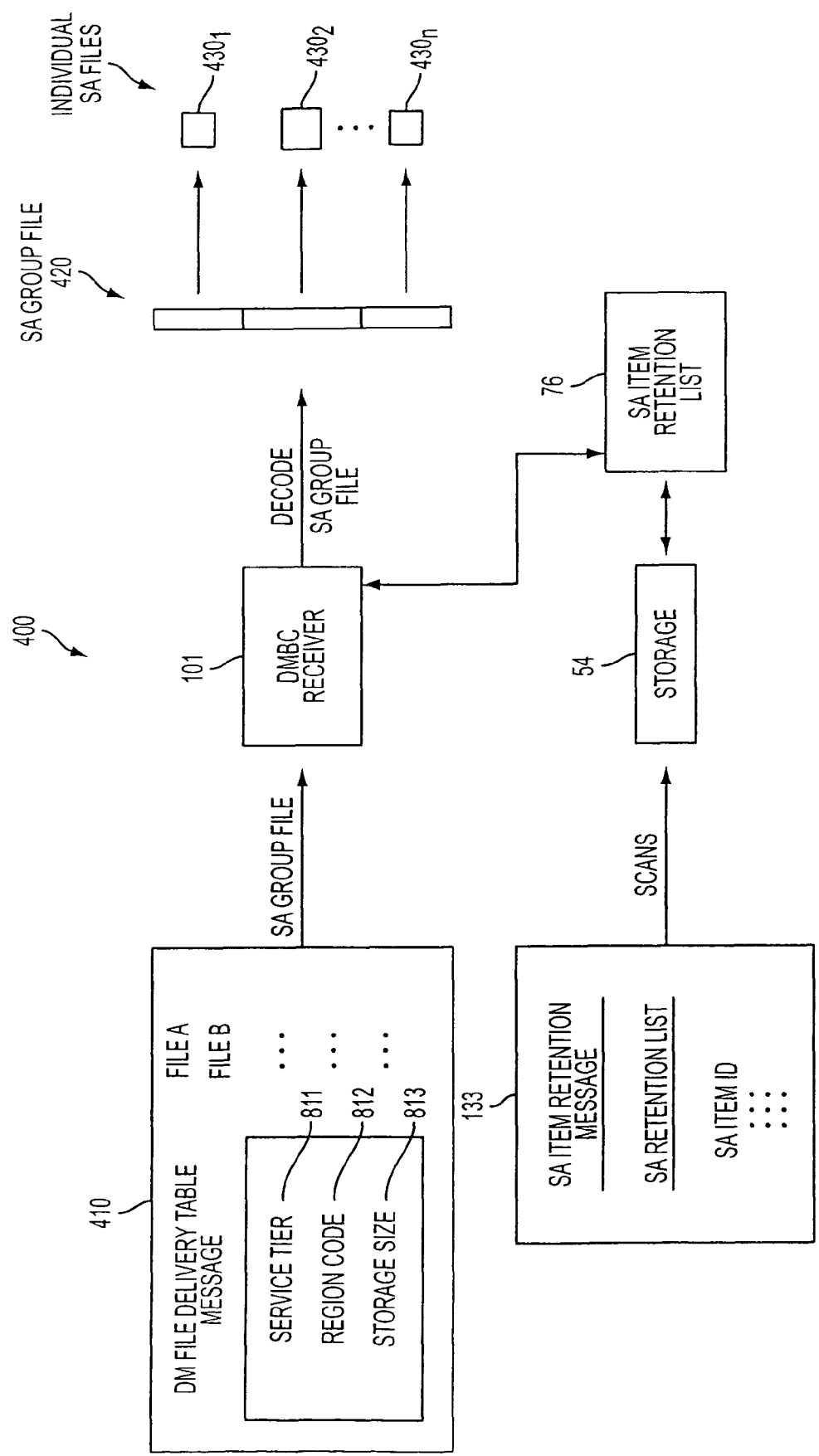
FIG. 7 is a block diagram illustrating a system for stored audio file, transmission, reception and management according to an exemplary embodiment of the present invention.

Referring to FIG. 7, as part of implementing the overall SA Item/Commercial Insertion Service (e.g., remapping/rebranding) of the present invention, a Radio SA Item Insertion Application 400 is responsible for receiving and managing the storage of the SA content. The tasks can be partitioned and sequenced as SA Group File Reception Enabling/Disabling, splitting received SA Group Files into individual SA Items, storing the SA Items to SA Item Files, accessing and using the SA Item Files over "lifetime" of SA Item, and deleting the SA Item Files at end of the SA Item "lifetime".

SA Group Files, which are files containing one or more individual SA Items, are received through the Digital Media Broadcast Channel (DMBC).

The SA Item Insertion Application 400 determines which SA Group Files have not yet been received and directs the DMBC Receiver 101 to receive and decode these files. Conversely, the SA Item Insertion Application 400 determines which SA Group Files have already been received and informs the DMBC Receiver 101 to skip reception and processing of these files.

The DMBC preferably comprises a SA Group File ID as a File Attribute in the File Delivery Table Message 410 provided to the DM FDT 48.

The Digital Media "File Delivery Table Message" 410 lists the SA Group Files 420 currently being transmitted over-the-air. The SA Group Files 420 are referenced by SA Group ID. Each SA Group can contain one of more SA Items. This "File Delivery Table Message" 410 also lists the Service Tier 411, Region Code 412 and Storage Size Tier 413 associated with the SA Group. The SA Item Insertion Application 400 enables the DMBC Receiver 101 to receive and decode each SA Group File if preferably all the following is true:

The SA Group Tier is less than the Radio Tier

The SA Group Region Code matches the Radio Region Code.

The SA Group Storage Size Class is greater than the Radio Storage Size Class.

The SA Group is not already received and available in radio storage.

An exemplary embodiment of the present invention provides that the radio stores SA content in units of SA Items, not SA Groups. Therefore, when SA Items are initially stored, the SA Group from which the SA Item 430 was extracted must also be appended and stored as part of the SA Item File 420. This supplies a "back-reference". The radio uses these SA Group "back-references" to determine whether current SA Groups listed in the DMBC File Delivery Table have already been received.

If a SA Group is listed in the DMBC File Delivery Table 48 and is also available in radio storage, which is known by existence of the SA-Group "back-references" attached to at least one SA Item in storage, then this SA Group is ignored and the DMBC Receiver 101 does not receive it.

After a SA Group File 420 has been fully received and decoded by the DMBC Receiver 101, the SA Item Insertion Application 400 is alerted that the SA Group File 420 is ready. Each SA Item that is part of the SA Group File 420 is extracted and stored in individual SA Item Files $430_1, 430_2, \ldots 430_n$. As each SA Item is stored, the SA Group ID for this SA Group in which the SA Item was received is also appended and stored in the SA Item file $430_n$. This provides a "back-reference" that documents which SA Groups have been successfully received. This is necessary so that the Commercial Insertion Application 800 can know which SA Groups to enable for reception, and which SA Groups to disable for reception.

In some cases, a newly received SA Item may have the same SA Item ID as a previously received SA Item that is currently in storage. The previous SA Item is deleted from storage, and replaced by the newly received SA Item.

The SA Item Insertion Application 400 utilizes the SA Item Retention Message 132 to determine which SA Items are specified for retention in radio storage 54. This SA Retention Message 133 facilitates radio storage space management. The radio has a maximum predefined amount of storage space reserved for SA Item Files. The radio must know which currently stored SA Items 66 are no longer in use and that may therefore be deleted in order to free storage space for newly received SA Group Files.

The SA Item Retention Message 133 may list both SA Groups and SA Items as "entities" to be retained. SA content is organized and stored in SA Item files, wherein the basic storage and usage unit for SA content is the SA Item. As stated above, when each SA Item was originally stored, the SA Group ID for the SA Group in which the SA Item was received is also appended and stored in the SA Item file to provide a "back-reference" that documents which SA Groups have been successfully received.

When a SA Item ID is listed in the SA Item Retention Message 133, this provides a one-to-one "direct" reference to the SA Item File in storage. When a SA Group ID is listed, this provides an "indirect reference" to SA Item Files in storage. To determine which SA Items should be retained in this case, the SA Item Insertion Application 400 scans the SA Items in storage 54 and builds a list 76 of their appended SA Group IDs. The SA Item Insertion Application deletes an existing SA Item from storage if the SA Item is not referenced either directly or indirectly in a SA Item Retention Message 133, or the SA Item is referenced in a SA Item Retention Message 133 but filtered by Radio Tier, Radio Region Code, or Radio Storage Size Class.

Rebranding

Hereinafter, a method remapping an existing channel to create a virtual channel by inserting stored audio segments into a live or buffered audio stream according to an exemplary embodiment of the present invention will continued to be described with reference to FIGS. 1, 2 and 3.

As explained above, remapping/rebranding using the SA Item/Commercial Insertion Service is a means for providing different tiers of subscriber services in addition to standard paid subscriber services. In accordance with an exemplary embodiment of the present invention, messages are sent to radios 55 to command them to use a different channel name and possibly different channel number or radio service and radio service provider name for a rebranded channel of a lower, less expensive subscription tier that has similar content to, for example, an original channel in a broadcast audio stream that is commercial free and subject to a higher monthly subscription fee.

To accomplish the above, the Commercial Insertion Messaging supports three additional capabilities:

A CI Channel Mapping List Message that defines each CI Channel and the actual standard radio channel it is linked to, The ability to identify live audio segments corresponding to DJ Chatter/Station-Callouts that are to be removed from the CI Channel stream, and An Indexed List or, alternatively, a Round-Robin List of substitution SA segments that are inserted in place of DJ Chatter Audio that is marked for removal, which are separate from the scheduled SA insertions. An Indexed List, for example, can control the substitution of a selected SA segment for a selected type of extracted content such as a certain SA segment being inserted for extracted live disk jockey chatter as opposed to an extracted station identification segment.

For each of the CI Channels supported, the CI Channel Map Message provides the CI Channel Number, CI Channel Name, and the Service ID of the corresponding standard radio channel.

The category names for each CI Channel are derived from the program type for the corresponding radio channels the CI Channels are linked to.

An exemplary embodiment of the present invention provides for identifying "DJ Chatter" audio segments 901 for removal. Audio Segments that correspond to "DJ Chatter/Station Call-outs" 901 can be marked as such utilizing additional fields in the Artist/Song Label Message.

An Audio Segment marked as "DJ-Chatter" should not be played on a CI Channel. When the current CI Channel is being played in buffer mode via the multiplexer 86, the DJ-Chatter can be simply removed from the buffer 84 when a Non-DJ-Chatter audio segment is available in the remaining buffer 82. However, when a Non-DJ-Chatter audio segment is not available in the buffer, or the CI Channel is currently playing in Live Mode, wherein no buffered audio 84 is available yet, then some other audio segment must be inserted and played in place of the DJ Chatter that is being removed. The DJ-Chatter Substitution List Message accomplishes this by providing a round robin list of Stored Audio segments that the radio selects from in the Default SA item list 72.

Audio Segments that correspond to "DJ Chatter/Station Call-outs" can be marked as such utilizing additional fields in the Artist/Song Label Message. The marking of Audio Segments (Songs) via Artist/Song Label Message to avoid SA Insertion thereafter, and to avoid removal of the Audio Segment from the play buffer is described above. The marking of Audio Segments to force removal as defined here is an extension to this. The following table outlines exemplary "marking" options in the Artist/Song Label Message. This table proposes, by way of example, using three fields in a service layer of a broadcast stream.

TABLE

Commercial Insertion Marking Options in the Artist/Song Label Message.

| Option Number | Artist/Song Label Bit Setting | Definition |
| --- | --- | --- |
| 0 | 0 0 0 | No Constraints |
| 1 | 0 0 1 | SA Insertion at end of this Song is disabled |
| 2 | 0 1 0 | This Song should NOT be deleted from the SA Insertion Broadcast Audio Buffer. |

TABLE-continued

Commercial Insertion Marking Options in the Artist/Song Label Message.

| Option Number | Artist/ Song Label Bit Setting | Definition |
| --- | --- | --- |
| 3 | 0 1 1 | Force Removal of this Song - Substitute with 5 sec Stored Audio |
| 4 | 1 0 0 | Force Removal of this Song - Substitute with 10 sec Stored Audio |
| 5 | 1 0 1 | Force Removal of this Song - Substitute with 15 sec Stored Audio |
| 6 | 1 1 0 | Force Removal of this Song - Substitute with 30 sec Stored Audio |
| 7 | 1 1 1 | Reserved. |

An important aspect of the rebranded CI Channels is the removal (i.e., avoidance of playback) of DJ Chatter from the original audio channel 10. The previously described method of identifying the DJ Chatter segments relies on new "DJ Chatter" marker bits defined in the BIC Artist Song Label Message. In a typical system configuration, this BIC Artist Song Label Message occurs once near the beginning of every Song (audio segment) transition and then repeats every 7 seconds. This relatively long repeat period can introduce problems in that if, due to a momentary low signal condition, a radio misses the first message that marks a DJ Chatter audio segment, then the radio might inadvertently play the DJ Chatter audio segment for up to seven seconds, until the next repeat message is received that properly identifies the audio segment as DF Chatter. It would be desirable to minimize the repeat period of this message (e.g., to less than 1 second) to minimize the "erroneous DJ Chatter play" period. Due to the additional information carried in the BIC Artist Song Label Message, increasing the repeat rate would have a significant increase in bandwidth needed for this message.

An alternative exemplary embodiment of the present invention is to define a new minimal-sized message that can be sent at a faster rate with a less significant impact on bandwidth. In addition to containing the DJ Chatter marking, this message could also contain the Song transition marking, and also possibly the "insert enable/disable" and "song removal enable/disable" markers. This alternative message is hereinafter referred to as a Commercial Insertion Fine Synchronization Message (CI Fine Sync Message).

Due to bandwidth constraints on the BIC channel, the CI Fine Sync Message can be carried on a different channel, preferably on the same channel/SID as the other Commercial Insertion Control Messages. This message differs from the other CI Control Messages in that it must be tightly synchronized to the live/real-time audio content. In a scheme where the CI Fine Sync Message shares the same SID as other messages, the system preferably gives higher priority in transmitting the CI Fine Sync Message in order to minimize latency. With reference to FIG. 2, this priority control can be implemented on a newly defined server 51' that:

generates the CI Fine Sync Messages based on real-time "Audio Info" input for each channel.

Receives AppID packets from the Broadcast Data Server (BDS) 51.

Outputs both BDS AppID packets and CI Fine Sync Message packets to the UDS, for output on a shared Data SID.

Remapping to Include Local or Market-Specific Inserted Content

In accordance with another exemplary embodiment of the present invention, content for insertion as SA items into a mapped or rebranded stream can be transmitted via a local content source, as opposed to using the digital media broadcast channel depicted in FIG. 2 (e.g., server 49) and its associated DM receiver 101 in the radio 55 depicted in FIG. 3. One of the advantages of using local content transmission in the SA Item/Commercial Insertion System is the ability to send localized advertising for a selected market (e.g., a geographic market comprising a city and its vicinity) for insertion into an SDARS stream received at a radio 55 in that market. Different local SA item transmission systems 300' and 300" are described above in connection with FIG. 2. An exemplary radio 55' configured to receive local content for insertion is depicted in FIG. 8.

Figure 8:
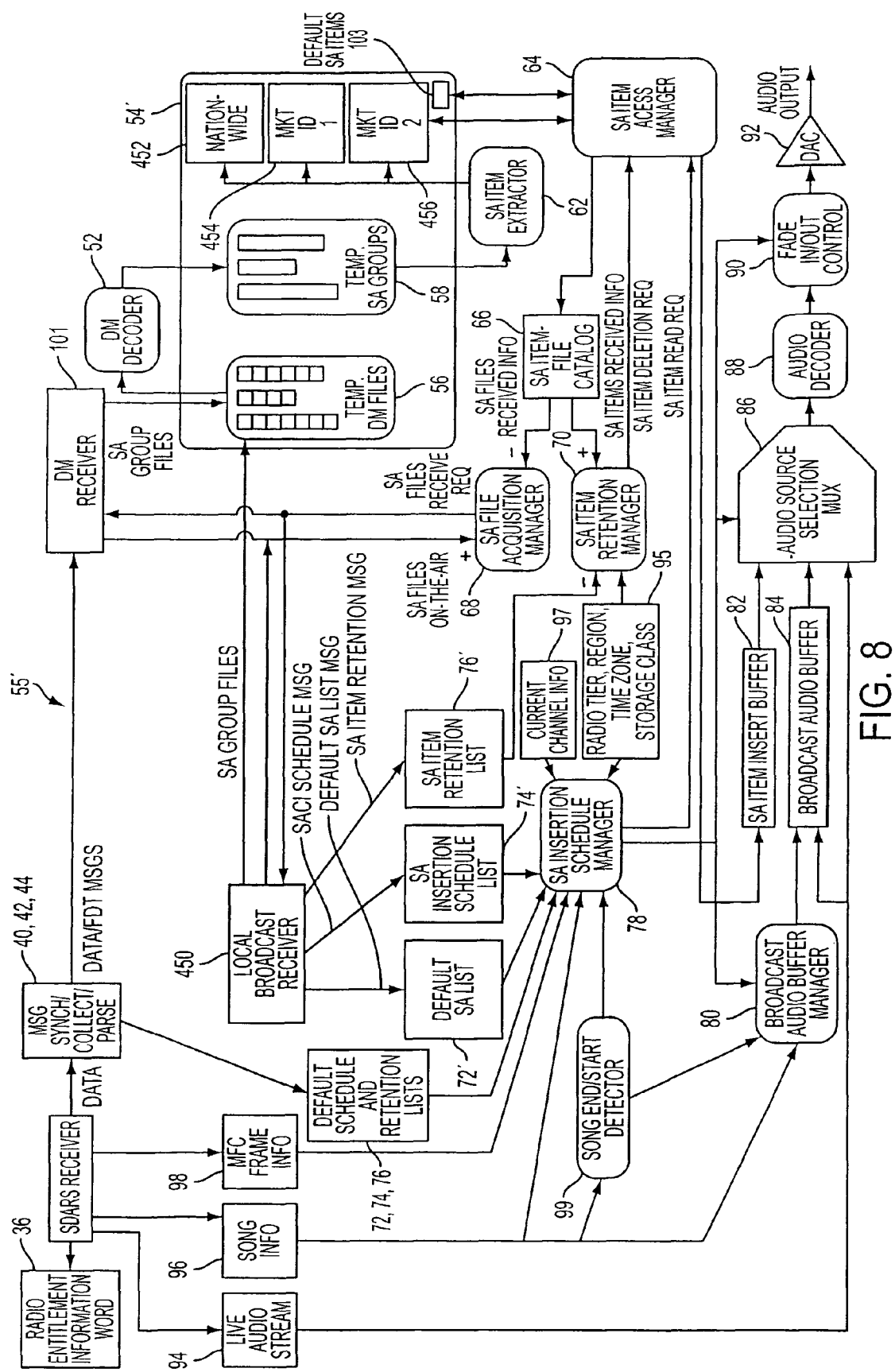
FIG. 8 illustrates a radio for implementing remapping/rebranding using insertion of localized or market-specific stored audio items in accordance with an exemplary embodiment of the present invention.

The radio 55' in FIG. 8 is substantially similar to the radio 55 in FIG. 3 and descriptions of like components will not be repeated here. The radio 55' is provided with at least one local broadcast receiver 500. The local broadcast receiver 450 is configured to receive signals comprising local advertising and control messaging transmitted using leased bandwidth (e.g., from HD Digital Radio™, the MediaFLO service of Qualcomm Inc. that broadcasts data as complementary service to cellular devices, among others). The control messaging comprises an SA item default list 72', a retention list 76' and an SA insertion schedule list 74' similar to the lists 72, 74 and 76 described above except for their SA items comprising local advertising content.

The storage 54' at the radio 55' preferably receives SA media files from both the local broadcast receiver 450 and the DM receiver 101 and builds temporary files as indicated at 56 which are decoded via decoder 52 and stored as SA groups as indicated at 58. The SA items are extracted from the SA groups and preferably stored in one of three memories 452, 454 and 456, depending on whether they comprise content corresponding to a national market, a first market, or a second market. The first and second markets are preferably geographically adjacent or proximal markets. SA items for at least two geographically adjacent markets are stored to prevent inadvertent overwriting of cached content specific to one market by cached content specific to the other market, particularly as a radio 55' roams in the areas served by these two markets. The SA items for the first, second and national markets can be distinguished using a first market identifier, a second market identifier and a nationwide identifier. A radio 55' will insert content specific to an active one of the first and second local markets if the content is available; otherwise, SA items having a nationwide identifier will be used for insertion purposes. It is to be understood that buffers for storing SA items specific to additional markets can be used. Market-specific SA items are preferably not deleted from the buffers 454 and 456 until the buffers are full and no retention message has been sent recently for a selected market. Different storage management messages can be employed depending on the needs of the area, market or classes of entitled radios employing the content and control messages sent by the transmission system 300' or 300".

It is to be understood that the present invention can also be embodied as computer-readable codes on a computer-readable recording medium. The computer-readable recording medium is any data storage device that can store data that can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A method of generating an audio stream with commercial insertion to provide tiered subscription services for a digital audio broadcast radio comprising:
    locating selected segments in a first audio stream, the first audio stream having a plurality of different types of segments comprising audio program segments, audio transmission channel identification segments, and audio disk jockey segments from at least a first disk jockey, the selected segments comprising at least one of the audio transmission channel identification segments and the audio disk jockey segments;
    extracting at least some of the selected segments to create corresponding insertion points;
    generating a second audio stream from the first audio stream by inserting selected ones of a plurality of stored audio items at the insertion points, the stored audio items comprising audio commercial segments; and
    providing tiered subscription services by providing said second audio stream to users at a lower cost than said first audio stream.

2. A method as claimed in claim 1, wherein the inserted items are not same duration as the extracted segments.

3. A method as claimed in claim 1, further comprising:
    storing the plurality of stored audio items in a first buffer;
    discarding the extracted ones of the selected segments;
    buffering the remainder of the first audio stream in a second buffer; and
    generating the second audio stream by selectively multiplexing the outputs of the first buffer and the second buffer depending on the insertion points.

4. A method as claimed in claim 3, further comprising purging at least part of the second buffer when the inserted items are longer than the extracted segments and the second buffer has reached a selected capacity.

5. A method as claimed in claim 1, wherein the stored audio items further comprise audio transmission channel identification segments indicating a second channel for the second audio stream that is different from a first channel indicated for the first audio stream, and audio disk jockey segments from a second disk jockey who is different from a first disk jockey used to create the first audio stream, and further comprising rebranding the second audio stream by inserting at least one of audio transmission channel identification segments indicating the second channel, and audio disk jockey segments from the second disk jockey into selected ones of the insertion points.

6. A method as claimed in claim 1, wherein the second audio stream comprises substantially the same audio program segments provided in the first audio stream.

7. A method as claimed in claim 6, wherein the audio program segments in the first audio stream and the second audio stream are directly mapped relative to each other within their respective streams.

8. A method as claimed in claim 1, further comprising:
    receiving the first audio stream;
    storing the audio program segments to a broadcast audio buffer;
    storing the audio commercial segments to a segment insert buffer; and
    controlling a multiplexer to selectively output segments from the broadcast audio buffer and the segment insert buffer to generate the second audio stream, the broadcast audio buffer being operable to retain a program audio segment following an insertion point for a period of time to allow insertion of at least one of the plurality of audio commercial segments at the insertion point when its duration is greater than the corresponding extracted segment.

9. A method as claimed in claim 1, wherein the first audio stream is a commercial free radio broadcast channel and the second audio stream is a radio broadcast channel comprising commercials.

10. A method as claimed in claim 1, wherein each of the plurality of segments comprises metadata associated therewith, further comprising:
    generating at a segment source the metadata corresponding to respective ones of the selected segments to mark them for extraction to facilitate locating them in the first audio stream; and
    receiving the metadata from the segment source at the digital audio broadcast radio.

11. A method as claimed in claim 1, wherein each of the plurality of segments comprises metadata associated therewith, further comprising:
    generating at a segment source the metadata corresponding to respective ones of the audio program segments to mark them for retention to avoid their extraction from the first audio stream; and
    receiving the metadata from the segment source at the digital audio broadcast radio.

12. A method as claimed in claim 1, wherein each of the plurality of segments comprises metadata associated therewith, further comprising:
    generating at a segment source the metadata corresponding to at least one of the audio program segments to indicate that no insertion of selected ones of the plurality of stored audio items is desired after this audio program segment and before the next audio segment; and
    receiving the metadata from the segment source at the digital audio broadcast radio.

13. A processor-readable storage medium having processor-readable code for programming a processing device in a digital audio broadcast radio to generate an audio stream with commercial insertion comprising:
    receiving a first audio stream live;
    locating selected segments in the first audio stream, the first audio stream having a plurality of different types of segments comprising audio program segments, audio transmission channel identification segments, and audio disk jockey segments from at least a first disk jockey, the selected segments comprising at least one of the audio transmission channel identification segments and the audio disk jockey segments; and
    extracting at least some of the selected segments to generate corresponding insertion points and storing the remainder of the first audio stream in a buffer; and inserting selected ones of a plurality of audio commercial items at the insertion points to generate a second audio stream for playback by the radio.

14. A processor-readable storage medium as claimed in claim 13, wherein the processor-readable code further programs the processing device in the radio to perform a plurality of operations comprising:
determining the extent to which the capacity of the buffer is used; and
deleting some of the buffered portion of the first audio stream when a selected buffer capacity condition is detected.

15. A processor-readable storage medium as claimed in claim 13, wherein the processor-readable code further programs the processing device in the radio to insert at least one of audio transmission channel identification segments indicating a different channel than a channel indicated for first audio stream, and audio disk jockey segments from a different disk jockey than a disk jockey who was used for creating the first audio stream into selected ones of the insertion periods to generate a rebranded second audio stream.

16. A processor-readable storage medium as claimed in claim 13, wherein the processor-readable code further programs the processing device in the radio to receive and process group files via over-the-air messaging comprising audio insertion items for storage at the radio, the audio insertion items being selected from the group consisting of the audio commercial items, different disk jockey segments, and audio transmission channel identification segments and selectively inserted into the second audio stream.

17. A processor-readable storage medium as claimed in claim 13, wherein at least one of the group files comprises a group of audio insertion items and their corresponding metadata that describes them and provides item identifiers, and a group identifier, and wherein the processor-readable code further programs the processing device in the radio to decode the group file and store therein at least one of the group file and the audio insertion items individually in a persistent storage location at the radio for access and insertion into the second audio stream in accordance with received audio insertion item schedule messages that have been broadcast to the radios, the processing device being operable to access the audio insertion items individually as needed if the group file is in the persistent storage location.

18. A processor-readable storage medium as claimed in claim 17, wherein the radios receive a digital audio broadcast service providing various channels of audio programming, the first audio stream corresponds to one the channels, and the received audio insertion item schedule messages comprise instructions regarding which of the channels to insert selected ones of the audio insertion items and at which times, and wherein the processor-readable code further programs the processing device in the radio to insert the audio insertion items into the second audio stream as instructed by the received audio insertion item schedule messages.

19. A processor-readable storage medium as claimed in claim 17, wherein the processor-readable code further programs the processing device in the radio to acquire and retain the audio insertion items in the persistent storage location in accordance with file delivery messages and retention messages broadcast to the radios, the sizes of the group files being selected by a server device according to memory constraints of the radios and the delivery durations of the group files relative to a typical radio availability time corresponding to when on average the radios are powered on and operable to receive the file delivery messages.

20. A processor-readable storage medium as claimed in claim 13, wherein
the processor-readable code programs the processing device in the radio to receive and process inserted item delivery messages comprising audio insertion items for storage at the radio, the audio insertion items being selected from the group consisting of the audio commercial items, different disk jockey segments, and audio transmission channel identification segments, the processor-readable code controlling the processing device in the radio to selectively insert the audio insertion items into the second audio stream in accordance with received audio insertion item schedule messages that have been broadcast to the radios,
wherein the radios receive a radio entitlement word and digital audio broadcast service providing various channels of audio programming, the radio entitlement word indicating to which of a plurality of classifications the radio belongs, the classifications comprising at least one of radio tier levels, regions, time zones, radio types and manufacturers of vehicles in which the radios are installed, and
the processor-readable code further programs the processing device in the radio to respond to messages indicating an entitlement classification to which the radio belongs and to ignore messages indicating an entitlement classification to which the radio does not belong, the messages comprising at least one of the received audio insertion item schedule messages, received retention messages indicating which of the audio insertion items to purge from the radio, and messages indicating when a selected one of the audio insertion items requires acquisition and storage by the radio.

21. A processor-readable storage medium as claimed in claim 13, wherein the inserting further comprises:
decreasing the volume of a segment occurring prior to an insertion point; and
increasing the volume of the inserted item provided in the second audio stream at that insertion point.

22. A processor-readable storage medium as claimed in claim 21, wherein the processor-readable code further programs the processing device in the radio to adjust the volume of the inserted item in accordance with a level agreed upon by a vendor for that inserted item.

23. A processor-readable storage medium as claimed in claim 22, wherein the processor-readable code further programs the processing device in the radio to receive the level from at least one of a received item delivery message comprising the inserted item and data indicating the level, and a item insertion scheduling message indicating when and the level at which to insert the inserted item into the second audio stream.

24. A processor-readable storage medium as claimed in claim 13, wherein the inserting further comprises:
decreasing the volume of an inserted item provided in the second audio stream at an insertion point; and
increasing the volume of a segment occurring after that insertion point.

25. A processor-readable storage medium as claimed in claim 13, wherein the inserting further comprises increasing the volume of a segment occurring after an inserted item provided in the second audio stream at an insertion point.

26. A method of providing broadcast content for insertion by radios into a received digital audio broadcast stream comprising:
dividing content items for broadcast to radios among group files, respective ones of the group files having between one and many content items therein and corresponding item identifiers to allow radios to store and access individual content item data and metadata of the content items for insertion, the sizes of the group files being selected by a server device according to memory constraints of the radios and the delivery durations of the group files relative to a typical radio availability time to enable reception of the content items by intermittently used radios; and delivering the group files and messages to the radios, the messages controlling when the radios are to insert the content items into a stream for playback selected from the group consisting of a live broadcast stream received at the radios, a buffered broadcast stream, and a remapped stream.

27. A method of generating audio streams with commercial insertion to provide tiered subscription services for digital audio broadcast radios comprising:

receiving and storing audio insertion items from customers;

receiving schedule requests indicating channels and frequency with which the customers want their audio insertion items inserted at radios into a received digital audio broadcast stream comprising various channels of audio programming;

transmitting the audio insertion items to radios for storage and access by the radios to perform insertions during playback; and generating and transmitting messages to radios comprising instructions for controlling which radios store which ones of the audio insertion items, which of the channels to insert selected ones of the audio insertion items during playback at the radios based on the schedule requests, the times at which to insert the audio insertion items during playback at the radios based on the schedule requests, and which audio insertion items are to be retained at the radios.

28. A method as claimed in claim 27, wherein transmitting the audio insertion items to the radios further comprises:

dividing the audio insertion items among group files, respective ones of the group files having between one and many audio insertion items therein;

providing the group files with item identifiers corresponding to the audio insertion items therein to allow radios to store and access individual audio insertion item data and metadata of the audio insertion items for insertion; and selecting the sizes of the group files via a server according to memory constraints of the radios and the delivery durations of the group files relative to a typical radio availability time to enable reception of the content items by intermittently used radios.

29. A method as claimed in claim 28, further comprising operating a test radio that receives the messages and the audio insertion items, performs insertions in accordance with the messages and provides a feedback link with radio log for monitoring compliance with the schedule requests.

30. A method as claimed in claim 27, wherein the generating and transmitting of messages comprises transmitting a radio entitlement word to each radio indicating to which of a plurality of classifications the radio belongs, the classifications comprising at least one of radio tier levels, regions, time zones, radio types and manufacturers of vehicles in which the radios are installed, the radio responding to the messages that indicate an entitlement classification to which the radio belongs and ignoring messages indicating an entitlement classification to which the radio does not belong.

31. A method as claimed in claim 27, wherein the transmitting of the audio insertion items to the radios and the transmitting of the messages to the radios is performed using a first broadcast transmission system covering a large geographic area, and further comprising:

receiving and storing localized audio insertion items from customers for broadcast to a smaller geographic area using a second broadcast transmission system;

receiving schedule requests indicating the channels and the frequency for where and when the customers want their localized audio insertion items inserted at the radios into the a digital audio broadcast stream received at the radios from the first broadcast transmission system;

transmitting the localized audio insertion items to the radios for storage and access by the radios to perform insertions during playback; and generating and transmitting messages to radios comprising instructions for controlling which radios store which ones of the localized audio insertion items, which of the channels to insert selected ones of the localized audio insertion items during playback at the radios based on the schedule requests, the times at which to insert the localized audio insertion items during playback at the radios based on the schedule requests, and which localized audio insertion items are to be retained at the radios, the radios being configured to store the localized audio insertion items, to extract selected audio segments from the digital audio broadcast stream to create insertion points, and to generate a second audio stream from the digital audio broadcast stream by inserting selected ones of the localized audio insertion items at the insertion points.

32. A method as claimed in claim 31, further comprising:

configuring radios to receive an audio stream, audio insertion items and schedule requests from each of the first broadcast transmission system, the localized second broadcast transmission system and a third broadcast transmission system localized to a different geographic adjacent to the geographic area served by the second broadcast transmission system and to a smaller geographic area than that served by the first broadcast transmission system depending from according which transmission system the radio can be tuned to receive;

configuring radios to store the audio insertion items in a first memory, a second memory and a third memory corresponding to whether they were received, respectively, via the first broadcast transmission system, the second broadcast transmission system and the third broadcast transmission system; and switching from inserting the localized audio insertion items from the second memory to inserting the localized audio insertion items from the third memory when the radio roams into the geographic area served by the third broadcast transmission system.

33. A method as claimed in claim 32, further comprising:

replacing the contents of either one of the second memory and the third memory of the radio with the audio insertion items from a fourth broadcast transmission system and operating the radio to insert these audio insertion items in accordance with schedule requests specific to a market serviced by the fourth broadcast transmission system, the market being a targeted audience characterized by at least one of radios in a selected location, radio listeners in a selected market, and other demographic characteristic.

34. A method as claimed in claim 27, wherein the first broadcast transmission system is a satellite digital audio broadcasting service.

35. A method as claimed in claim 27, further comprising transmitting a message indicating song labels and identifying a disk jockey chatter segment for audio programs in the received digital audio broadcast stream to facilitate extracting segments therefrom for replacement using insertion.

* * * * *